(12) United States Patent
Intravatola

(10) Patent No.: US 8,599,097 B2
(45) Date of Patent: Dec. 3, 2013

(54) COLLAPSIBLE PORTABLE STAND WITH TELESCOPING SUPPORT AND INTEGRAL STORAGE CASE

(75) Inventor: Lawrence Shane Intravatola, Chesapeake, VA (US)

(73) Assignee: Air Systems, Inc., Chesapeake, VA (US)

( * ) Notice: Subject to any disclaimer, the term of this patent is extended or adjusted under 35 U.S.C. 154(b) by 404 days.

(21) Appl. No.: 12/432,525

(22) Filed: Apr. 29, 2009

(65) Prior Publication Data

US 2009/0284963 A1   Nov. 19, 2009

Related U.S. Application Data

(60) Provisional application No. 61/053,229, filed on May 15, 2008.

(51) Int. Cl.
*H01Q 1/27* (2006.01)
(52) U.S. Cl.
USPC .......................................... 343/881; 206/573
(58) Field of Classification Search
CPC ....................................................... H01Q 1/27
USPC ......... 206/569, 573, 575, 576, 577, 579, 320, 206/803; 343/880, 881, 882, 883, 889
See application file for complete search history.

(56) References Cited

U.S. PATENT DOCUMENTS

| | | | |
|---|---|---|---|
| 1,521,610 A | 1/1925 | Finesilver | |
| 2,285,868 A | 6/1942 | Muler | |
| 2,531,215 A * | 11/1950 | Harmon | 455/269 |
| 3,315,621 A | 4/1967 | Szymber | |
| 3,415,476 A | 12/1968 | McDermott | |
| 3,812,847 A | 5/1974 | Moore | |
| 4,771,293 A * | 9/1988 | Williams et al. | 343/757 |
| 4,815,757 A | 3/1989 | Hamilton | |
| 4,830,579 A * | 5/1989 | Cheng | 417/234 |
| 5,012,394 A | 4/1991 | Woodward | |
| 5,459,648 A | 10/1995 | Courtney | |
| 5,531,419 A * | 7/1996 | Gustafsson et al. | 248/519 |
| 5,833,352 A | 11/1998 | Goodwin | |
| 5,964,524 A | 10/1999 | Qian | |

(Continued)

FOREIGN PATENT DOCUMENTS

| | | |
|---|---|---|
| CN | 200980118376.X | 6/2012 |
| DE | 3825666 A1 | 9/1989 |

(Continued)

*Primary Examiner* — David Fidei
(74) *Attorney, Agent, or Firm* — Daniel Schein, Esq.

(57) ABSTRACT

A collapsible portable stand comprises support legs and a mast that collapse into a small equipment enclosure or case, forming one single, integral unit that provides for storage, stable support for a device that is mounted onto the mast, and portability. The legs and mast are operatively connected to the case and preferably have extendable length. In an embodiment, the legs and mast are connected to the case via hinges that provide for the legs and mast to rotate with respect to the case. The case preferably has wheels and an extendable handle for ease of transport when the legs and mast are collapsed into the case. An embodiment includes an internal storage case that has a moveable cover that can include controls for and/or connections to a device stored in the internal storage case. An alternative embodiment includes a larger portable stand that has components that are external of the case and/or are independent of a case.

9 Claims, 35 Drawing Sheets

(56) References Cited

U.S. PATENT DOCUMENTS

| | | | |
|---|---|---|---|
| 6,659,620 B2 | 12/2003 | Goto | |
| 6,682,209 B2 | 1/2004 | Drake et al. | |
| 6,926,428 B1 | 8/2005 | Lee | |
| 7,397,435 B2 * | 7/2008 | McEwan | 343/713 |
| 7,470,036 B2 | 12/2008 | Deighton | |
| 7,598,916 B2 * | 10/2009 | Inbal et al. | 343/718 |
| 7,628,271 B1 * | 12/2009 | Marton | 206/320 |
| 7,679,573 B2 * | 3/2010 | Shuster et al. | 343/766 |
| 2002/0063072 A1 * | 5/2002 | Pham | 206/320 |
| 2003/0103357 A1 | 6/2003 | Drake et al. | |
| 2007/0159781 A1 * | 7/2007 | Zbikowski | 361/683 |
| 2008/0129543 A1 | 6/2008 | Lee | |

FOREIGN PATENT DOCUMENTS

| | | |
|---|---|---|
| EP | 09747498.5 | 10/2012 |
| JP | 11-317110 A | 11/1999 |
| KR | 10-2010-7028107 | 8/2012 |
| TW | 098115754 | 10/2011 |
| WO | WO 03/098097 A1 | 11/2003 |
| WO | PCT/US2009/43829 | 8/2009 |

* cited by examiner

LEG BASE INNER FLANGE
RIGHT SIDE

LEG BASE INNER FLANGE
LEFT SIDE

LEG BASE INNER FLANGE
FLAT PATTERN

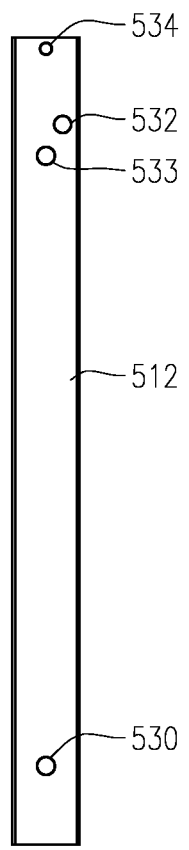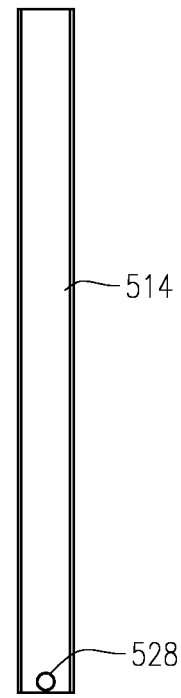
FIRST LEG SEGMENT
FIG. 18
SECOND LEG SEGMENT
FIG. 19

MAST PIVOT SUPPORT ASSEMBLY
TOP ISOMETRIC VIEW

MAST PIVOT SUPPORT ASSEMBLY
BOTTOM ISOMETRIC VIEW

MAST PIVOT SUPPORT ASSEMBLY
LOCKED "UP" POSITION

MAST PIVOT SUPPORT ASSEMBLY
STORAGE "DOWN" POSITION

MAST PIVOT SUPPORT ASSEMBLY
EXPLODED

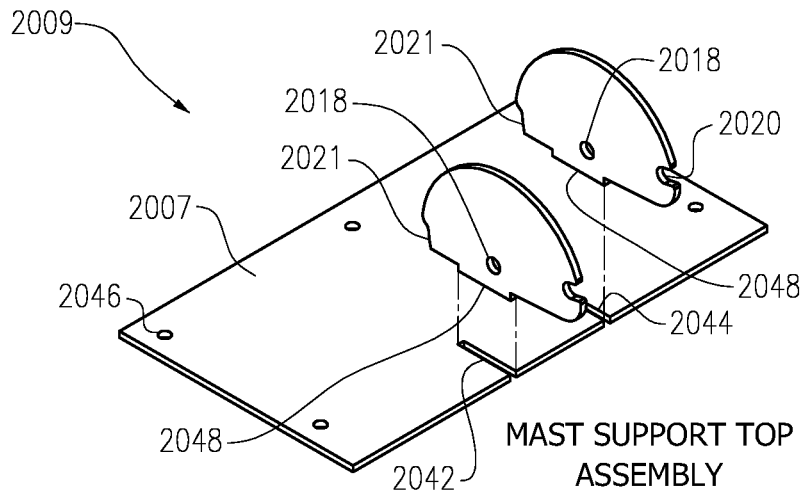
FIG. 26 MAST SUPPORT TOP ASSEMBLY
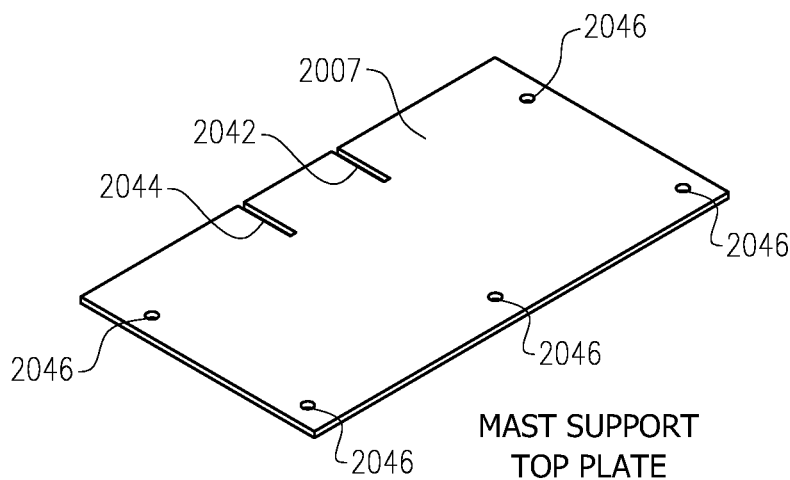
FIG. 27 MAST SUPPORT TOP PLATE
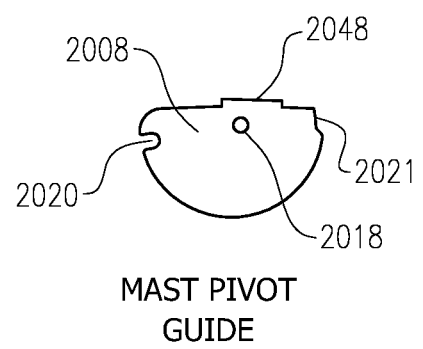
FIG. 28 MAST PIVOT GUIDE

MAST SUPPORT BRACKET ASSEMBLY

MAST SUPPORT BRACKET

MAST SUPPORT BRACKET FLAT PATTERN

MAST SUPPORT BRACKET BOTTOM PLATE

MAST PIVOT LOCK PULL HANDLE

MAST CLAMP

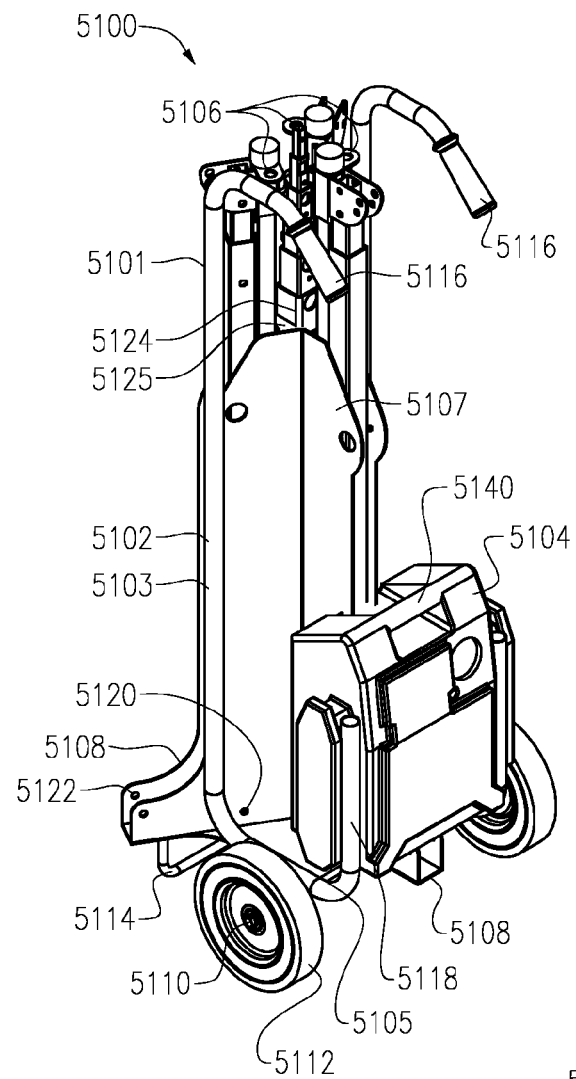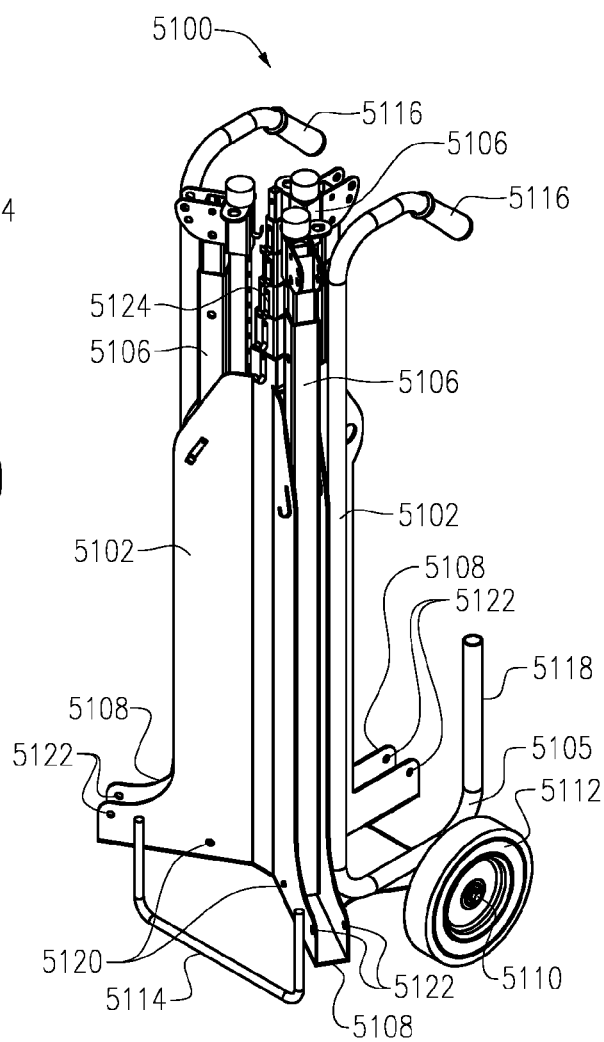
FIG. 51
FIG. 52

COLLAPSIBLE PORTABLE STAND WITH TELESCOPING SUPPORT AND INTEGRAL STORAGE CASE

PRIORITY

This application claims priority of U.S. Provisional Patent Application Ser. No. 61/053,229, filed May 15, 2008.

FIELD OF THE INVENTION

The present invention relates generally to stands for supporting items in an elevated position with respect to the surroundings, and more specifically relates to stands that are portable, easy to set up for use at a site, easy to collapse for storage and transport, and do not require connection of parts at a site of use for use nor disconnection of any parts in order to collapse the stand for storage and transport.

BACKGROUND

The need for temporary stands to support items at an elevated position with respect to their surroundings is ubiquitous. For example, temporary lighting is required at dark remote job sites. However, if there are multiple parts that need to be connected in the dark in order to set up the platform, work will be delayed, injuries can occur and parts can be lost and/or not available at all. Even if there is a light, a stand that is not self contained and that requires connection of parts to erect delays work at the job site while parts are located, if not lost, and connected together. Microphones, podium platforms, loudspeakers, cameras, sensors, and surveying equipment are only a few of the functional devices that require support by a stand and that would benefit if the stand can be set up quickly and collapsed for storage and transport. Further, a portable stand for different functional devices may be required for use at various locations over time. The user generally needs the stand along with numerous other items to meet particular needs. For example, a road crew that works at night may need to use a light stand and many other pieces of equipment. So, a stand of small size, low weight, and that is simple to set up and collapse for storage is desired. The stand must also be robust for repetitive use, rough handling, and corrosive environments. For use in dangerous environments, the stand and its components should be intrinsically safe. When deployed, the stand should be stable under expected conditions of use. For example, a stand holding a work light should not tip over when set up in a location where there are strong winds and/or where it may be jostled by surrounding people and equipment. Job sites that have explosive, fire or other safety hazards also require equipment to be intrinsically safe.

Numerous devices have been designed in an effort to meet the need for a portable stand. For example, U.S. Pat. No. 6,702,708 discloses a collapsible stand for supporting a traffic sign. Others have designed portable lighting units and/or cases for containing and protecting lights during storage and transport. Examples of same are found in U.S. Pat. No. 1,521,610, U.S. Pat. No. 2,285,868, U.S. Pat. No. 3,812,847, U.S. Pat. No. 5,012,394, U.S. Pat. No. 5,833,352, U.S. Pat. No. 5,964,524, U.S. Pat. No. 6,659,620, U.S. Pat. No. 6,926,428, and U.S. Pat. No. 7,470,036. Nevertheless, there remains a need for a stand that better meets the needs discussed above.

SUMMARY OF THE INVENTION

Referring to FIG. 1, a perspective view of an embodiment of the present invention is illustrated. A collapsible portable stand 100 comprises support legs 510 and a mast 2000 that collapse into a small equipment enclosure or case 200, forming one single, integral unit that provides for storage, stable support for a device that is mounted onto the mast, and portability. The legs and mast are operatively connected to the case and preferably have extendable length. In an embodiment, the legs and mast are connected to the case via hinges that provide for the legs and mast to pivot with respect to the case. Preferably, set up and collapse of the legs and mast is accomplished with tactile sensed mechanisms, such as spring biased buttons, so that one can readily set up and collapse the stand in dim or no light by touch. The case preferably has wheels and an extendable handle for ease of transport when the legs and mast are collapsed into the case. Preferably, the case volume is sufficient to store the functional device that is (or devices) connected to the mast (or mast sections), and optionally the case stores a power source, functional device controls, remote control and/or monitoring equipment. The legs and bottom wall of the case provide a stable support for the mast (e.g., the 2 leg configuration of FIG. 1 can provide the stability of a tripod). The height of the mast is preferably adjustable, and connection of the mast to the upper wall of the case increases the height of the mast by the height of the case. Preferably, the case is of plastic and is brightly colored and/or reflective to increase visibility. The legs are preferably of a material that can withstand corrosive and harsh conditions, such as stainless steel. The mast is preferably made of aluminum which is light weight, yet sufficiently strong to support a variety of devices. The case is robust, easy to carry and protects the stand and a device connected to the stand during transport and storage. Upon set up, the stand is stable, and can optionally be supported by connection of the legs, mast and/ or case to the surrounding surface via a suitable mooring. Preferably, electrical wiring, structural components, and functional devices are intrinsically safe to reduce the risk of explosion or fire. The center of gravity of the stand with a device connected to the mast can be adjusted by altering the angle of the mast with respect to the base. Pads on the bottom wall of the support legs can be attached via threaded bolts (or pivotally attached) so that the pads can accommodate for variations in the surface on which the stand is placed. The case door can also act as a leg to provide additional stability and support for the device mounted on the stand. For a smaller footprint, the legs of the device do not need to be fully extending. Further, if extra stability is needed, weight could be placed into the case bottom when deployed (e.g., a refillable plastic container that can be filled with dirt or rocks on site could be included).

In a preferred embodiment, there are no pieces or components of the stand that need to be connected to one another to assemble the stand nor are there components that need to be disconnected to collapse the stand into the case. Preferably, the functional device to be mounted on the mast can be connected to the stand at the factory or principal location of the user, so that the functional device does not need to be connected at the site of use or disconnected for subsequent storage and transport. Exemplary embodiments of portable stands of the present invention are described below, including a non-limiting exemplary embodiment incorporating a light.

Other features and advantages of the present invention summarized above can be understood from the following additional description of exemplary embodiments of the invention and upon reference to the accompanying drawings herein.

BRIEF DESCRIPTION OF THE FIGURES

FIG. 18 a plan view of the first leg segment shown in FIG. 16.

FIG. 19 a plan view of the second leg segment shown in FIG. 17.

FIG. 26 is an exploded perspective view of the mast support top assembly shown in FIG. 25.

FIG. 27 is a perspective view of the mast support top plate shown in FIG. 26.

FIG. 28 is a plan view of a mast pivot guide shown in FIG. 26.

FIG. 51 is a top-angled front perspective view of a fourth exemplary embodiment of a collapsible portable stand with telescoping support.

FIG. 52 is a top-angled rear perspective view of the collapsible portable stand shown in FIG. 51.

FURTHER DETAILS OF THE INVENTIONS

Figure 1:
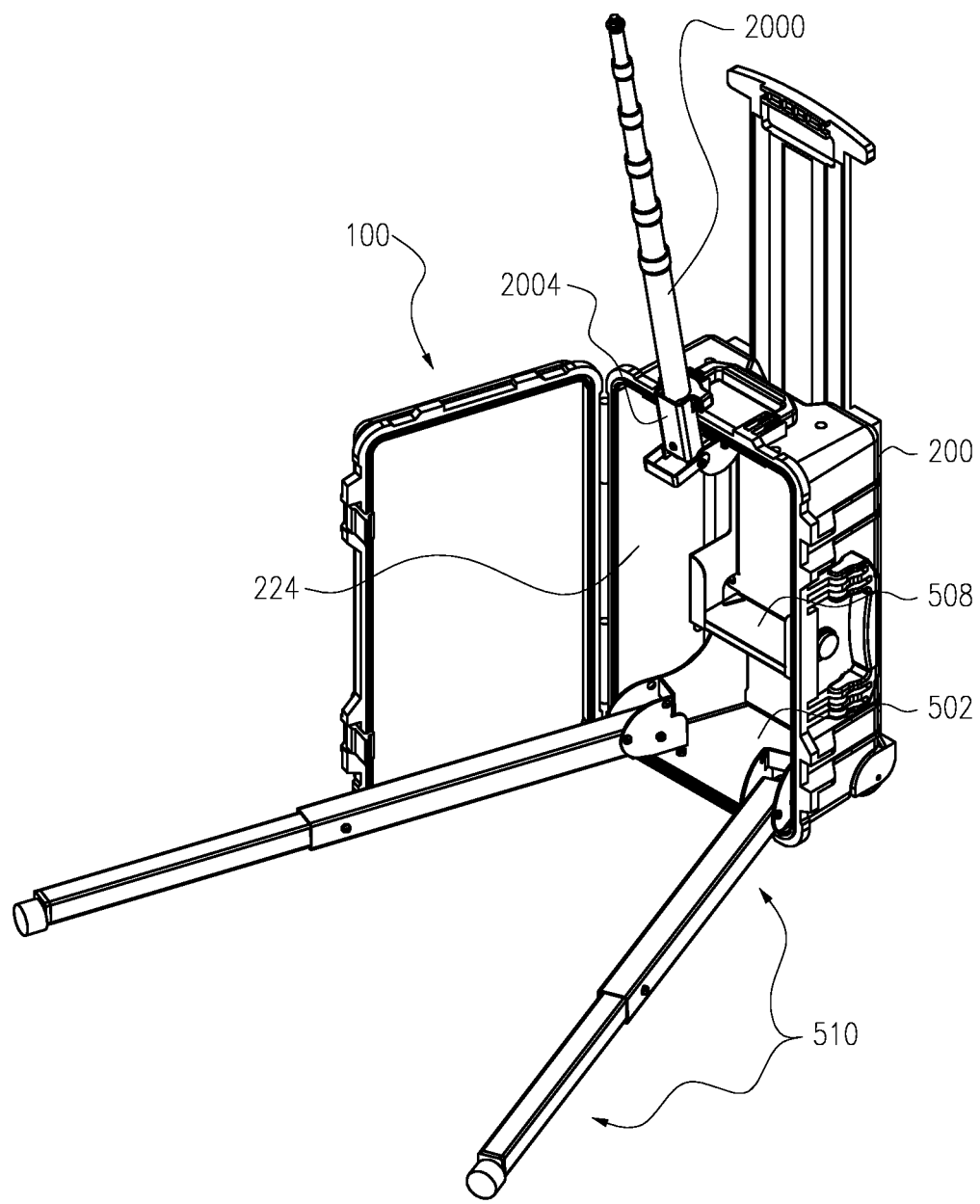
FIG. 1 is a perspective view of a first exemplary embodiment of a collapsible portable stand of the present invention with extendible legs, a telescoping support and an integral storage case, shown at 1/8 scale (all scales provided are based on reproduction on 8.5"×11" paper, but are exemplary as device can be of varying size).
Figure 55:
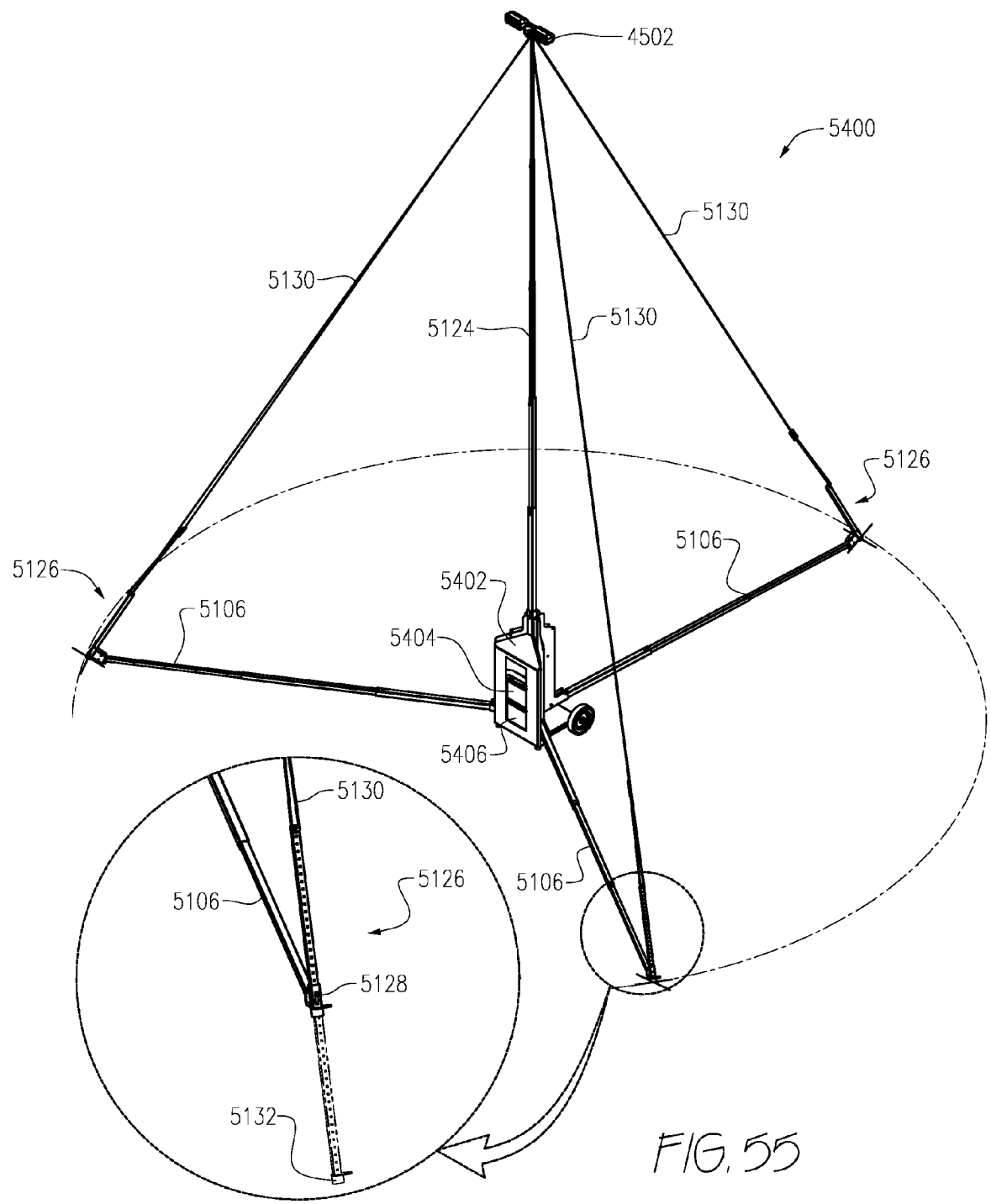
FIG. 55 is a top-angled perspective view of the collapsible portable stand of FIG. 54 configured with the leg assemblies and telescoping support fully extended.

Similar reference numerals are used in different figures to denote similar components. The following provides further details of the present inventions summarized above and illustrated in the Figures. Referring to FIGS. 1-55, exemplary embodiments of assembled collapsible portable stands with extendable masts, their components and their assembly are illustrated.

FIG. 1 is a perspective view of a first exemplary embodiment of a collapsible portable stand of the present invention with extendible legs, a telescoping mast or support for a functional device and an integral storage case shown at ⅛ scale. The scale is provided to understand relative dimensions of parts of preferred exemplary embodiments illustrated and described herein. The scale used in particular Figures has been provided above in the description of the Figures. However, the scales used herein should not be deemed as limiting since larger and smaller embodiments are envisioned to be within the scope of the invention. Functional devices that may be operatively attached to the mast include but are not limited to one or more of lights, microphones, surveying equipment, still cameras, video cameras, microwave communication devices, radiofrequency and/or electromagnetic communication devices, chemical sensors, thermal sensors, motion sensors, an alarm, a speaker, a monitor or other audio and/or visual output, weather detection devices, solar and/or wind power generator, a GPS (global positioning system) device, and a taser or other weapon. Functional devices may include controls and mechanisms to direct same.

Referring to FIGS. 1-5, stand 100 includes an integral storage case 200, a telescoping mast assembly 2000 and an inner case assembly 500 (isolated in FIG. 4) that includes a base assembly 502, an inner mount case 508, a first telescoping leg assemblies 510 and a second telescoping leg assembly. Telescoping mast assembly 2000 mounts to an upper interior face of case 200. Base assembly 502 is mounted to a bottom interior face of case 200. Inner mount case 508 rests on top of base assembly 502 and mounts to a back interior face of case 200.

A junction between base assembly 502 and a telescoping leg assembly 510 includes a pivot, or hinge, that allows a telescoping leg assembly 510 to be locked at different positions relative to the hinge. In a first position, the leg assembly extends from an interior space 224 of case 200, e.g., in a plane substantially parallel to a plane of the bottom interior face of case 200. In a second position, the telescoping leg assembly may remain, when fully retracted, within interior space 224 of case 200.

Telescoping mast assembly 2000 includes a mast pivot support assembly 2004 that allows telescoping mast assembly 2000 to be locked at different positions relative to the mast pivot support assembly. In a first position, telescoping mast assembly 2000 extends from interior space 224 of case 200, e.g., in an upward direction away from case 200. In a second position, telescoping mast assembly 2000 extends downwards and remains, when fully contracted, within interior space 224 of case 200. A suitable telescoping tubular mast for this embodiment can be of aluminum having a maximum diameter of about 1 & ½ inch, such as for example, a mast acquired from Testrite Visual Products, Inc. of Hackensack, N.J. When the mast is vertically extended above the case to its maximum height, a functional device can be elevated about 96 inches above the base of the case. However, masts of other materials and dimensions may be used depending on the desired use. Preferably, for the subject embodiment, the case with its cover, legs, and mast weighs less than about 25 pounds.

In a preferred embodiment, the device of FIGS. 1-5 has a case body (not including the door), having outer dimensions with a height of about 22", a width of about 14", and is about 7" deep. The legs can pivot out to extend about 18" from the case body, further telescoping out to about 32" (or in another the legs can be unfolded to extend further). The angle that the legs project from the case walls and from each other may vary depending on the case features. It is envisioned that the angle and connections of the legs to the case can be adjustable in some embodiments; for example, the leg pivots may be slidably connected to the case base via captured wingnuts set in elongated slots that permit relative motion without detachment. While hollow square stainless steel tubes are a preferred material for forming the legs, other materials and leg shapes may be used. In the embodiment of FIGS. 1-5, the outer leg segments are formed of 1 & ½" square tubing and the inner leg segments that fit into the outer leg segments are of 1 & ¼" square tubing.

Figure 2:
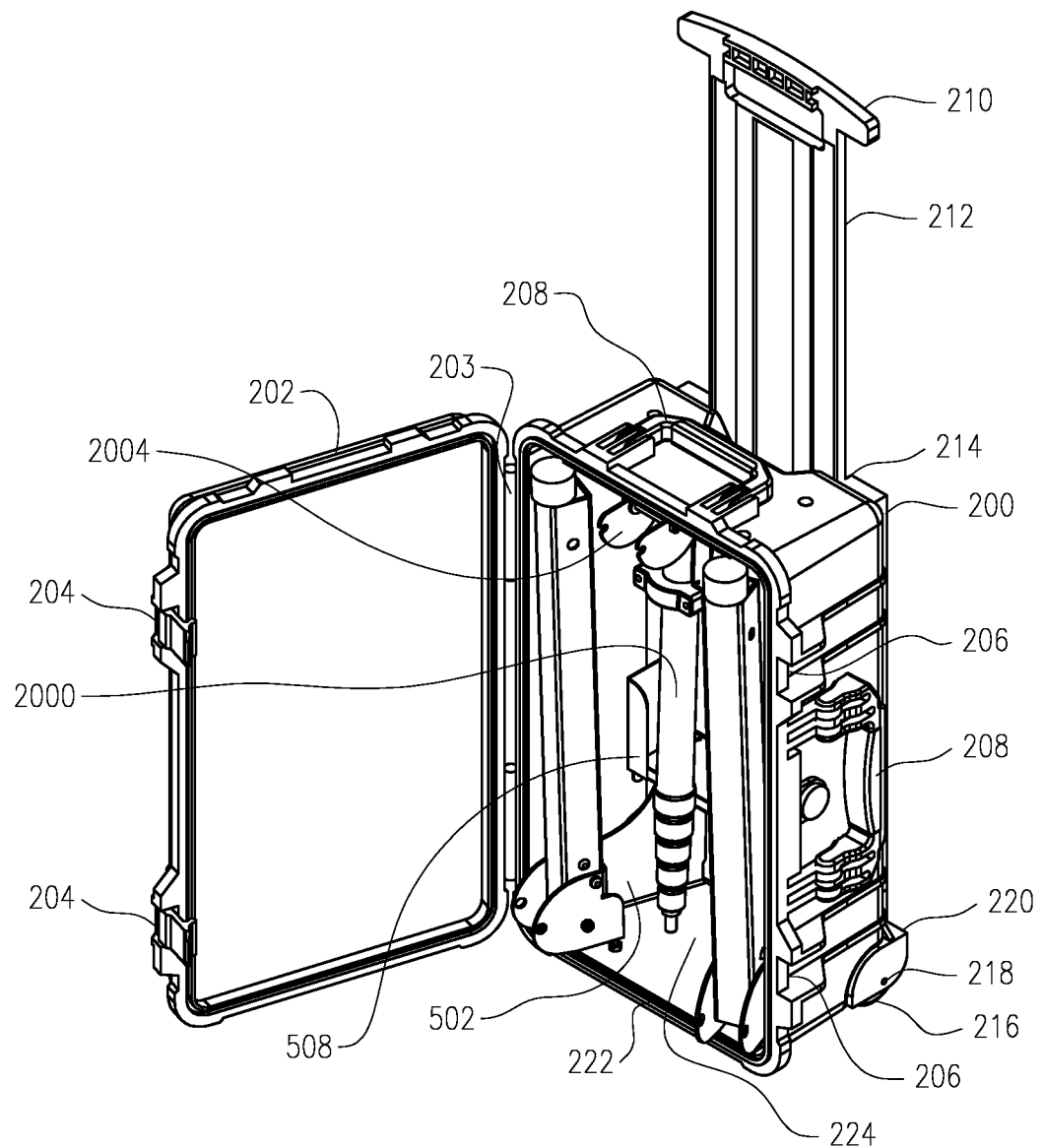
FIG. 2 is a perspective view of the collapsible portable stand of FIG. 1 in which the extendible legs and the extendible telescoping support have been retracted and folded into the integral storage case (1/6 scale).

FIG. 2 is a perspective view of the collapsible portable stand of FIG. 1 in which the extendible legs and the extendible telescoping support have been retracted and folded into the integral storage case. Specifically, each telescoping leg assembly 510 has been retracted and folded at the pivot with base assembly 502 into interior space 224 of case 200. Further, the telescoping mast of telescoping mast assembly 2000 has been retracted, and the mast has been folded at the pivot of the mast pivot support assembly 2004 into interior space 224 of case 200. In an alternative embodiment, the mast may have an infinitely adjustable pivot angle, which may be accomplished for example by using captured wing nuts set in elongated grooves in the mount.

As further shown in FIG. 2, case 200 includes an exterior door 202 that is connected to case 200 at a hinge 203. When placed in a closed position, a male clasp 204 on exterior door 202 aligns with and locks onto a female clasp 206 on case 200, thereby securing exterior door 202 to case 200. Case 200 further includes a lift handle 208 on one or more exterior faces of case 200 to facilitate lifting case 200 by one or more persons.

In addition, case 200 includes one or more wheels 216 and a towing handle 210 that allows case 200 to be towed on the one or more wheels. For example, as shown in FIG. 2, a wheel 216 attaches to case 200 at axel 218 and is protected by a wheel guard 220. Towing handle 210 includes a slide 212 that fits into a track 214 in case 200, thereby allowing towing handle 210 to retract into case 200 when not in use.

Figure 3:
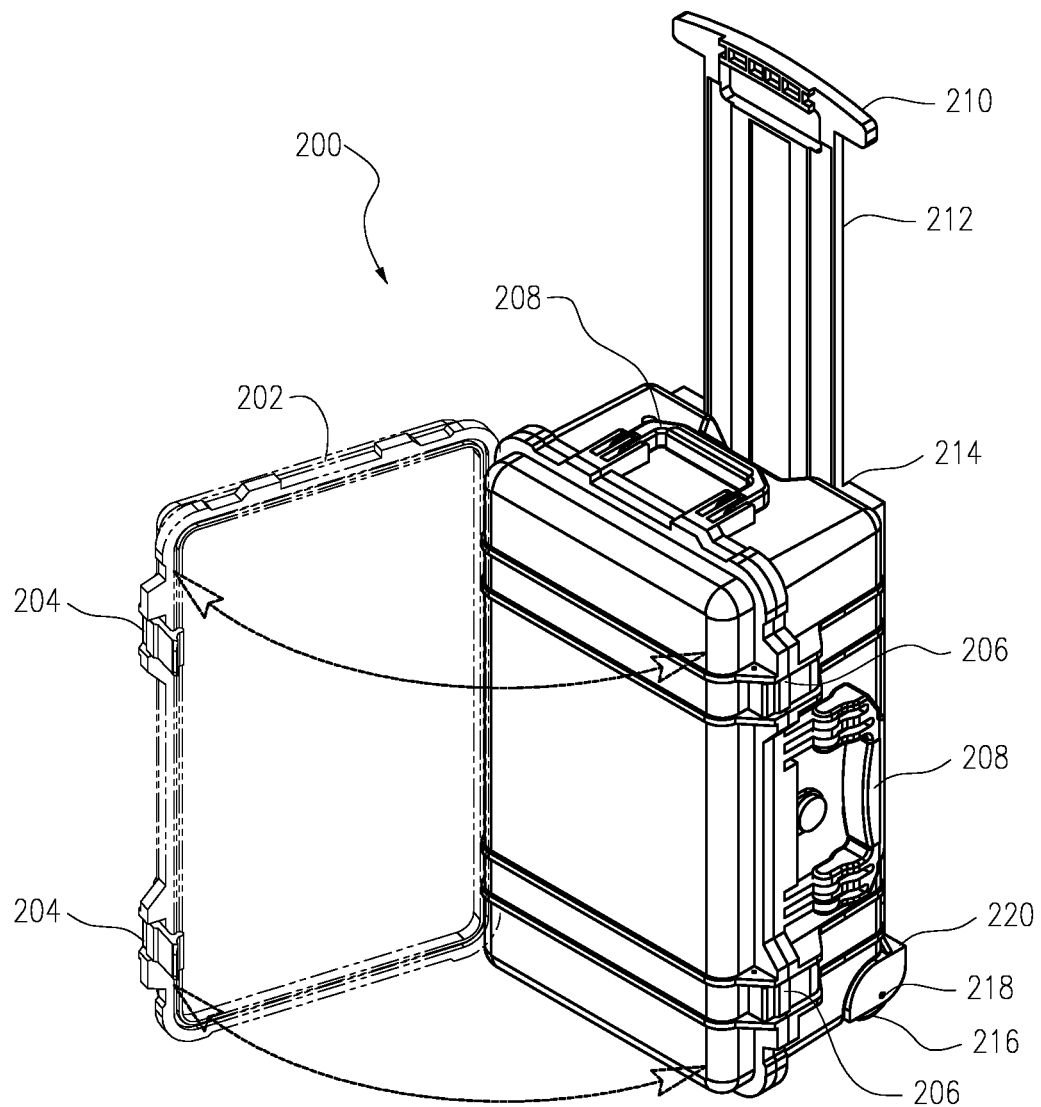
FIG. 3 is a perspective view of the collapsible portable stand of FIG. 2 demonstrating closure and securing of the exterior case storage case door (1/6 scale).

FIG. 3 is a perspective view of the collapsible portable stand of FIG. 2 in which the exterior storage case door is shown in both an open and a closed/locked position.

Figure 4:
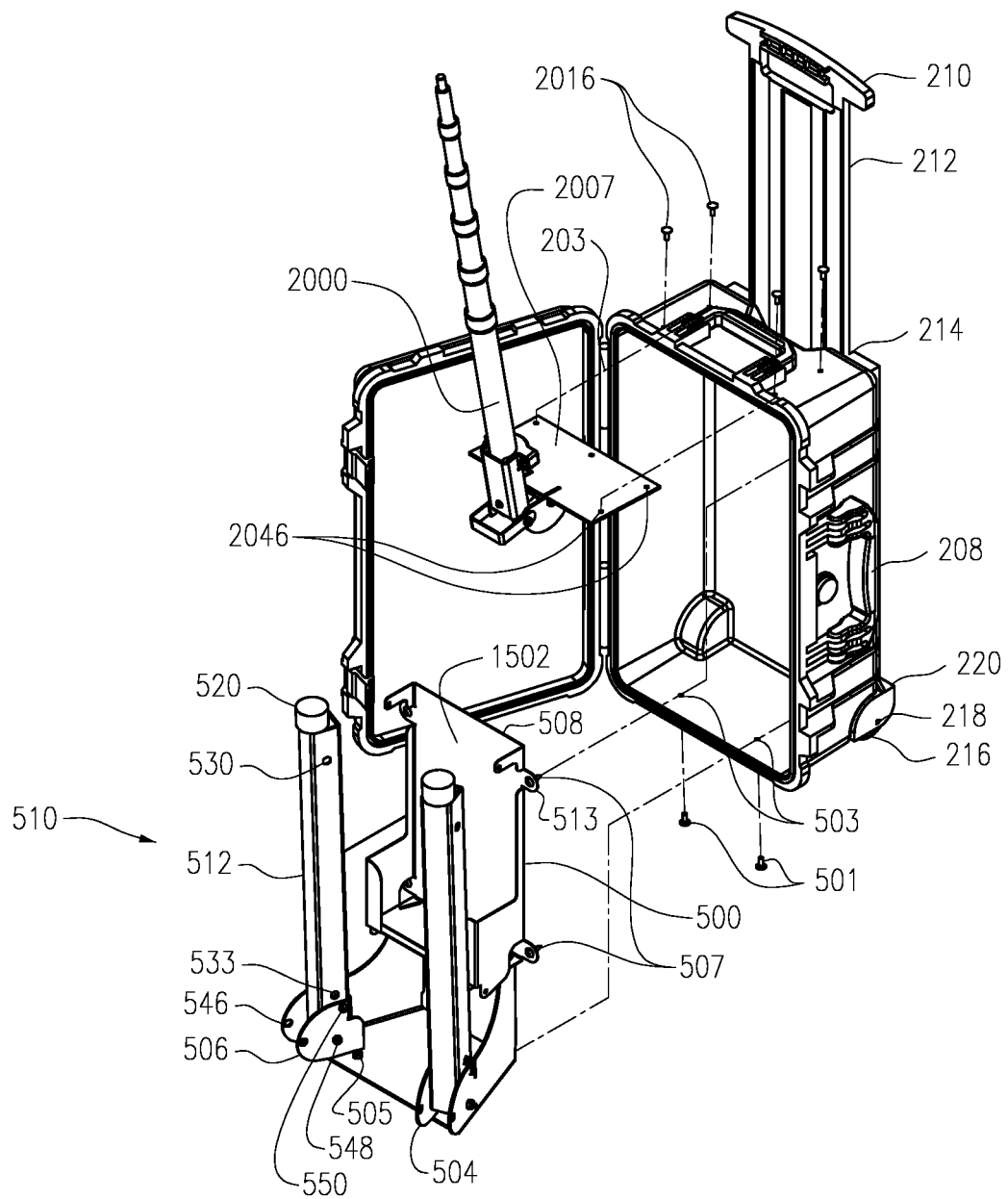
FIG. 4 is a partially exploded perspective view of the collapsible portable stand of FIG. 1 (1/8 scale).
Figure 5:
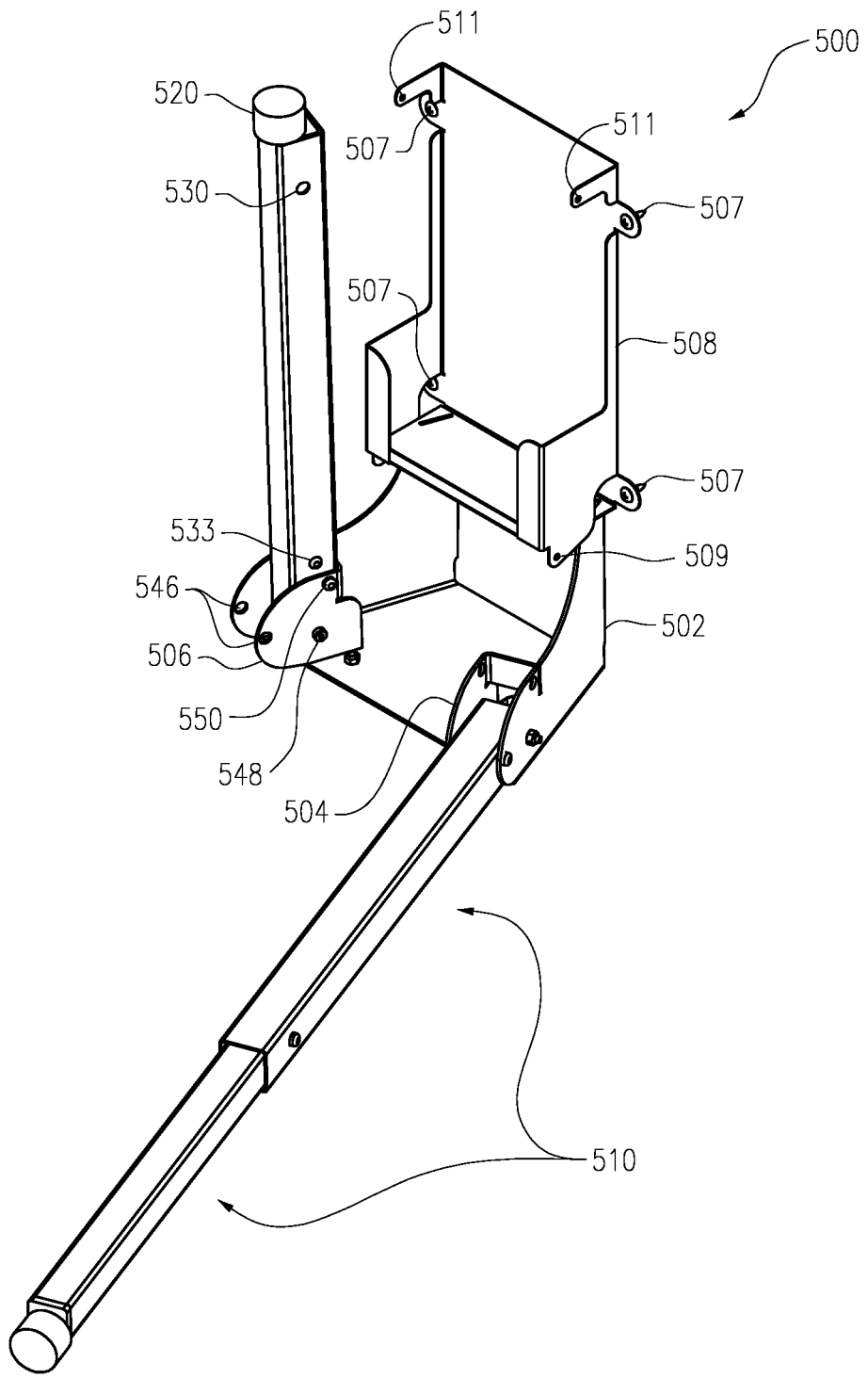
FIG. 5 is a perspective view of the inner case assembly shown in FIG. 4 (1/6 scale).
Figure 6:
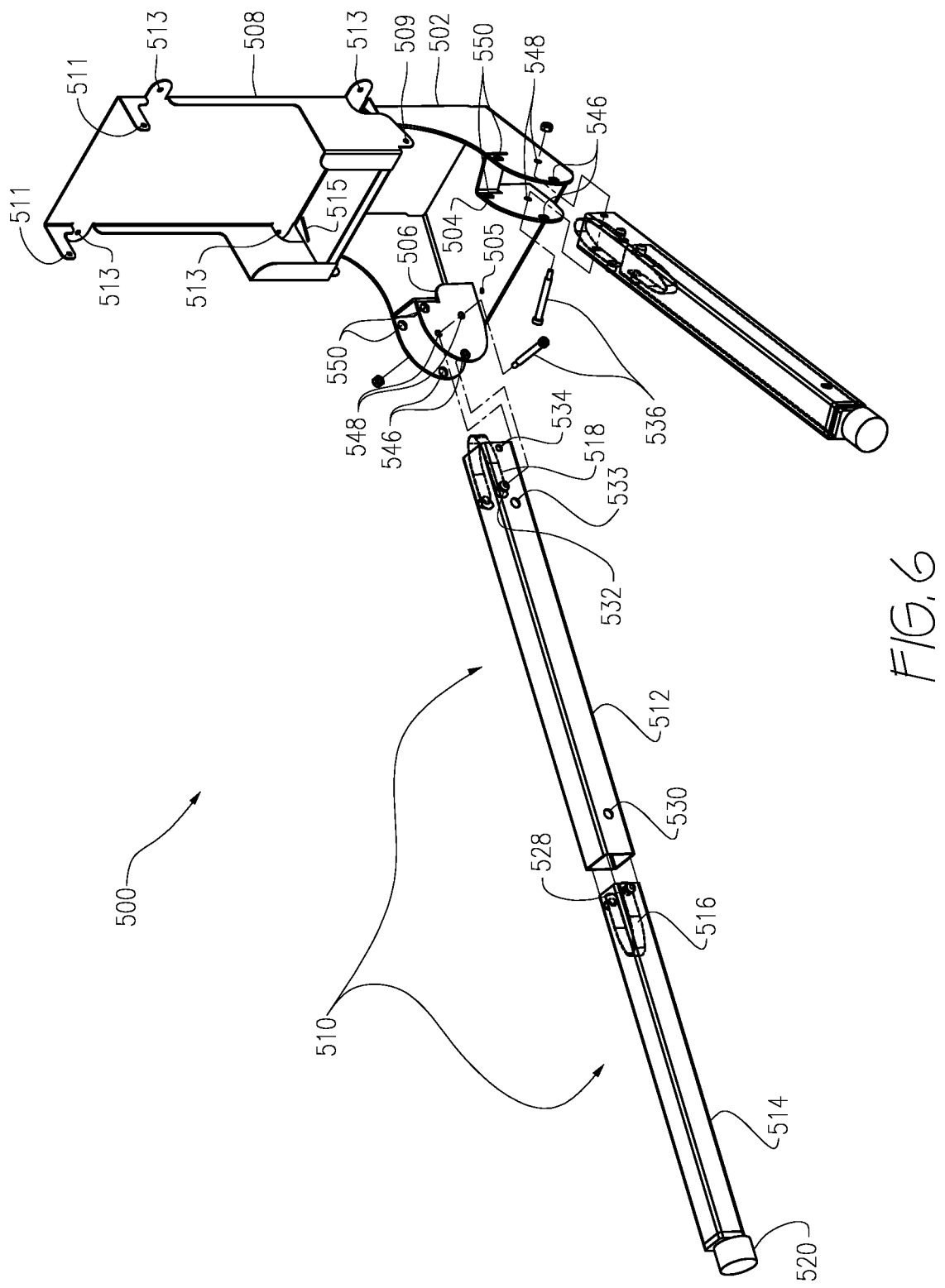
FIG. 6 is a perspective view of the inner case assembly shown in FIG. 5 that includes an exploded perspective view of telescoping leg assemblies included in the inner case assembly (1/5 scale).

FIG. 4 is a partially exploded perspective view of the collapsible portable stand of FIG. 1. FIG. 5 is a perspective view of inner case assembly 500, as shown in FIG. 4. FIG. 6 is a perspective view of inner case assembly 500 that includes an exploded perspective view of the respective telescoping leg assemblies.

As shown in FIGS. 4-5, holes 505 in a base plate of base assembly 502 are aligned with holes 503 in a bottom interior face of case 200, thereby allowing base assembly 502 to be secured to the bottom interior face of case 200 with fasteners 501. Holes 513 in back plate 1502 of inner mount case 508 are aligned with holes in a back interior face of case 200, thereby allowing inner mount case 508 to be secured to the back interior face of case 200 with fasteners 507. Holes 2046 in mast assembly mounting plate 2007 of telescoping mast assembly 2000 are aligned with holes in an upper interior face of case 200, thereby allowing telescoping mast assembly 2000 to be secured to the upper interior face of case 200 with fasteners 2016.

As further shown in FIG. 5 and FIG. 6, a telescoping leg assembly 510 includes a first leg segment 512 that receives a second leg segment 514 that is secured at one of two positions within in first leg segment 512. For example, second leg segment 514 is fixed at an extended position relative to first leg segment 512 by aligning and engaging protruding pins of spring pin 516 with through holes 530 in first leg segment 512. Second leg segment 514 is fixed at a retracted position relative to first leg segment 512 by aligning and engaging protruding pins of spring pin 516 with through holes 533 in first leg segment 512.

As further shown in FIG. 5 and FIG. 6, a telescoping leg assembly 510 is attached to base assembly 502 by aligning through holes 534 in first leg segment 512 with through holes 548 in base assembly 502 and fastening bolt 536 through the aligned holes. Once telescoping leg assembly 510 has been attached to base assembly 502, telescoping leg assembly 510 may be set in a first, or extended position, by pivoting telescoping leg assembly 510 on bolt 536 to align and engage protruding pins of spring pin 518 with through holes 546 in base assembly 502, as shown with a first leg assembly in FIG. 5. Telescoping leg assembly 510 may be set in a second, or folded position, by pivoting telescoping leg assembly 510 on bolt 536 to align and engage protruding pins of spring pin 518 with through holes 550 in base assembly 502, as shown with a second leg assembly in FIG. 5.

Figure 7:
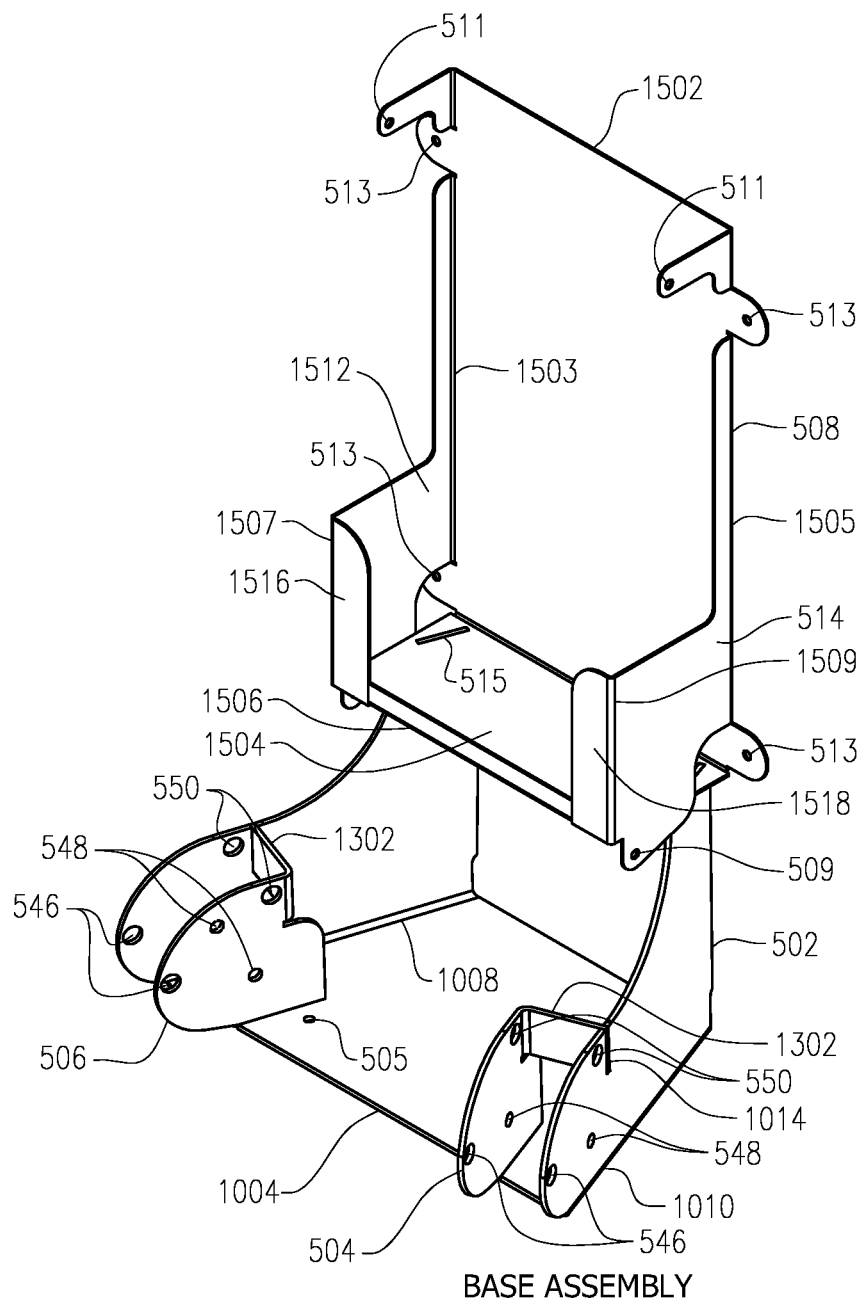
FIG. 7 is a perspective view of an inner mount case and base assembly shown in FIG. 6 (1/4 scale).
Figure 8:
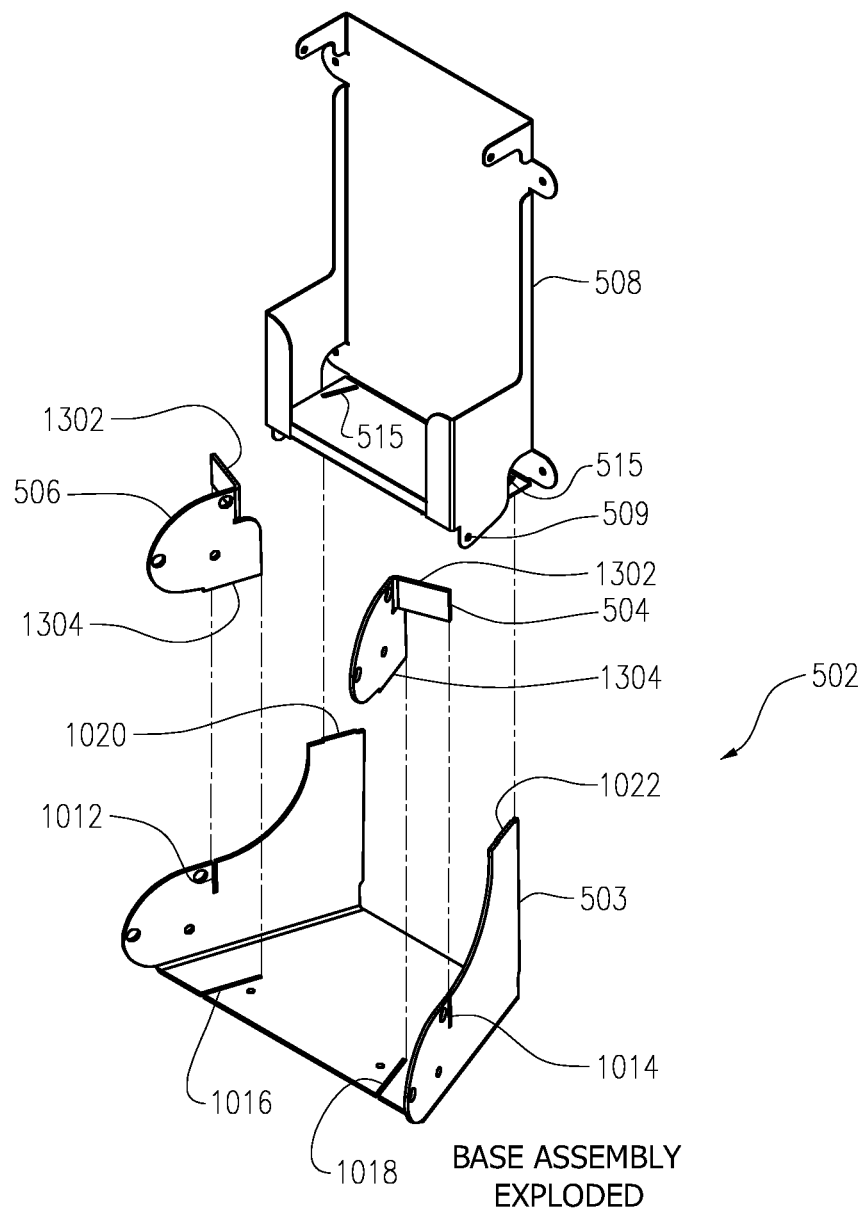
FIG. 8 an exploded perspective view of the base assembly shown in FIG. 6 (1/6 scale).

FIG. 7 is a perspective view of base assembly 502 joined to inner mount case 508, as shown in FIG. 6. FIG. 8 is an exploded perspective view of base assembly 502 and inner mount case 508, as shown in FIG. 7.

As shown in FIG. 7 and FIG. 8, base assembly 502 is formed by joining a leg base plate 503 to a right side leg base inner flange 504 and a left side leg base inner flange 506. For example, a bottom tab 1304 and a spacer tab 1302 of right side leg base inner flange 504 are inserted and secured into slot 1018 and slot 1014 of leg base plate 503, respectively. Further, a bottom tab 1304 and a spacer tab 1302 of left side leg base inner flange 506 are inserted and secured into slot 1016 and slot 1012 of leg base plate 503, respectively. Inner mount case 508 is secured to base assembly 502 by inserting and securing top tab 1020 and top tab 1022 of base assembly 502 into a respective slot 515 in inner mount case 508

Figure 9:
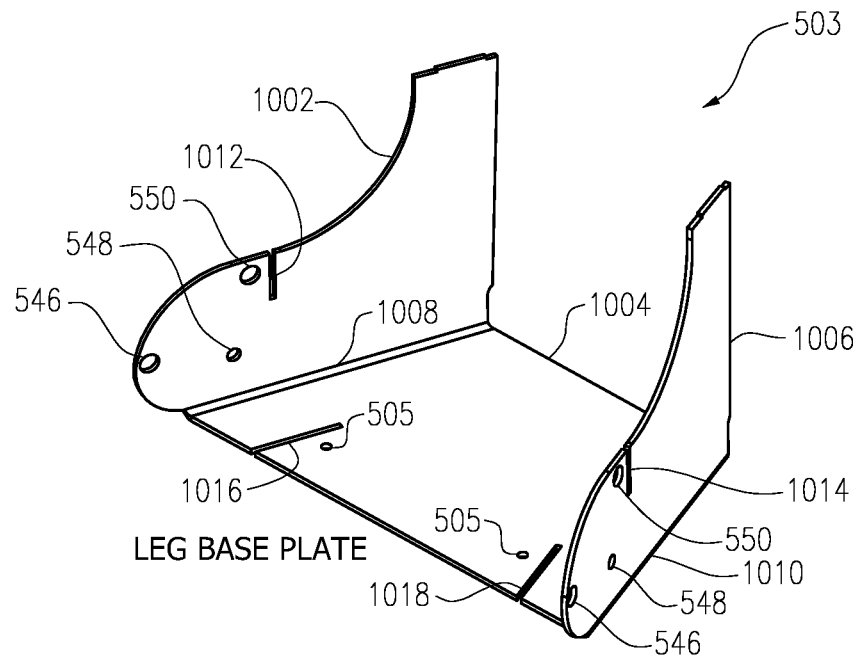
FIG. 9 a perspective view of the leg base plate shown in FIG. 8 (1/4 scale).
Figure 10:
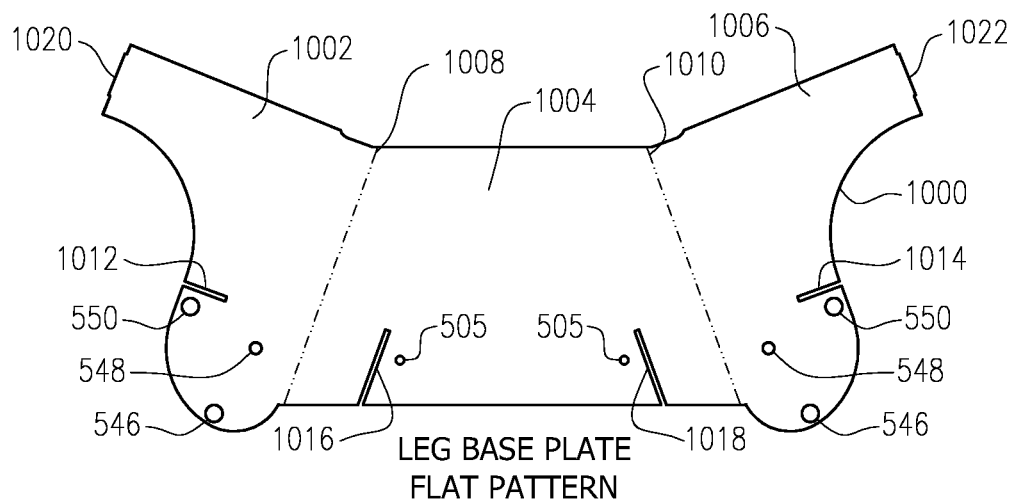
FIG. 10 a flat pattern for making the leg base plate shown in FIG. 9 (1/4 scale).

FIG. 9 is a perspective view of leg base plate 503 of the base assembly 502 shown in FIG. 8. FIG. 10 shows a flat pattern 1000 for making the leg base plate 503 as shown in FIG. 9. Base plate 503 may be fabricated from a sheet of metal that has been cut, e.g., with a metal saw, metal cutting stamp or metal cutting laser.

As shown in FIG. 10, a piece of sheet metal cut in accordance with pattern 1000 includes a left side 1002, a base 1004, and a right side 1006. Left side 1002 is separated from base 1004 by a fold line 1008. Right side 1006 is separated from base 1004 by a fold line 1010.

Left side 1002 includes top tab 1020, slot 1012, through hole 546, through hole 548, and through hole 550. Base 1004 includes slot 1016, slot 1018 and base holes 505. Right side 1006 includes top tab 1022, slot 1014, through hole 546, through hole 548, and through hole 550. Folding left side 1002 and right side 1006 upwards 90 degrees from base 1004 along fold line 1008 and along fold line 1010, respectively, results in a leg base plate 503, as shown in FIG. 8 and FIG. 9.

Figure 11:
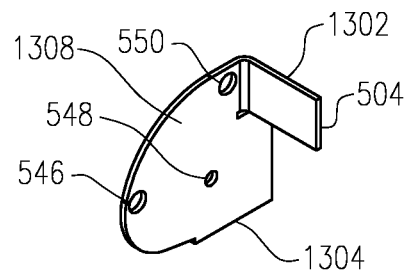
FIG. 11 is a perspective view of the leg base inner flange, right side, shown in FIG. 8 (1/4 scale).
Figure 12:
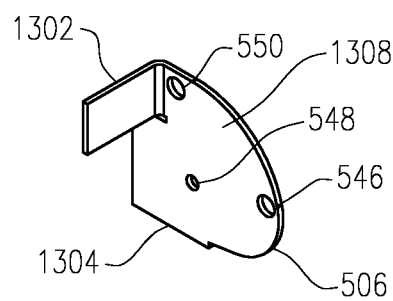
FIG. 12 is a perspective view of the leg base inner flange, left side, shown in FIG. 8.
Figure 13:
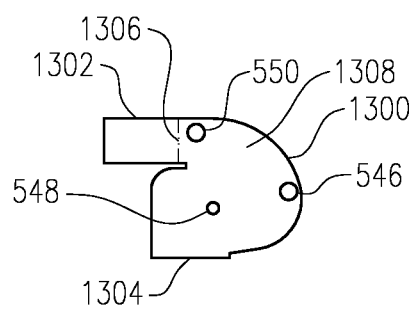
FIG. 13 is a flat pattern for making the left leg base inner flange and right leg base inner flange shown in FIG. 11 and FIG. 12.

FIG. 11 is a perspective view of the leg base inner flange, right side, shown in FIG. 8. FIG. 12 is a perspective view of the leg base inner flange, left side, shown in FIG. 8. FIG. 13 is a flat pattern for making the left leg base inner flange and right leg base inner flange shown in FIG. 11 and FIG. 12.

A right side leg base inner flange 504 and a left side leg base inner flange 506 may be fabricated from a sheet of metal that has been cut, e.g., with a metal saw, metal cutting stamp or metal cutting laser, in the shape, or pattern, shown in FIG. 13 at 1300. As shown in FIG. 13, a piece of sheet metal cut in accordance with pattern 1300 includes a spacer tab 1302, a fold line 1306, a main flange body 1308 and a bottom tab 1304. Main flange body 1308 includes through hole 546, through hole 548, and through hole 550.

As shown in FIG. 11 and FIG. 12, folding spacer tab 1302 ninety degrees in a first direction relative to a plane of main flange body 1308 results in a right side leg base inner flange 504; folding spacer tab 1302 ninety degrees in a second direction relative to a plane of main flange body 1308 results in a left side leg base inner flange 506.

Figure 14:
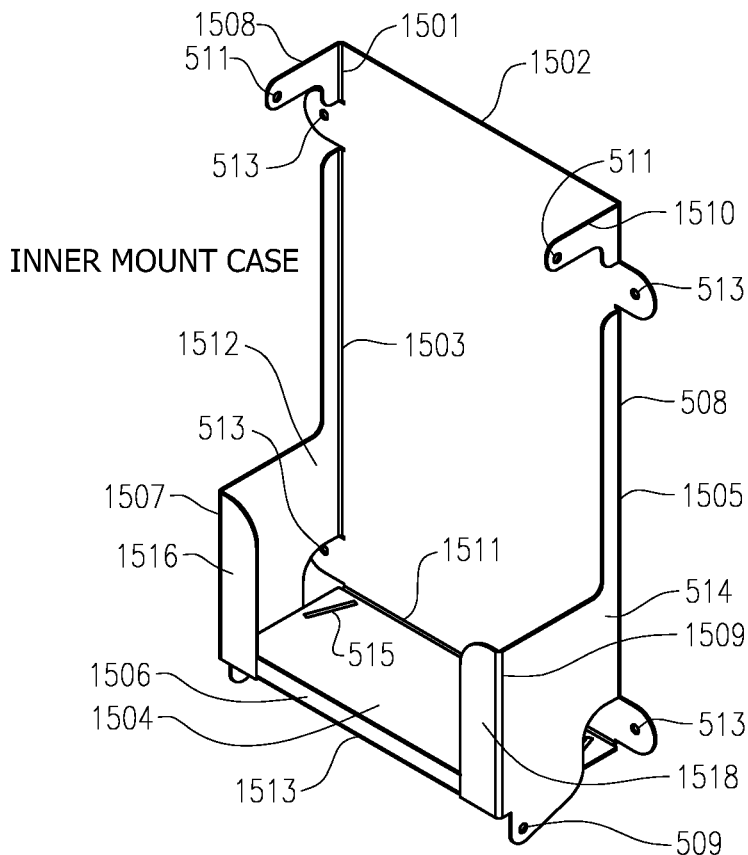
FIG. 14 is a perspective view of the inner mount case shown in FIG. 8 (1/4 scale).
Figure 15:
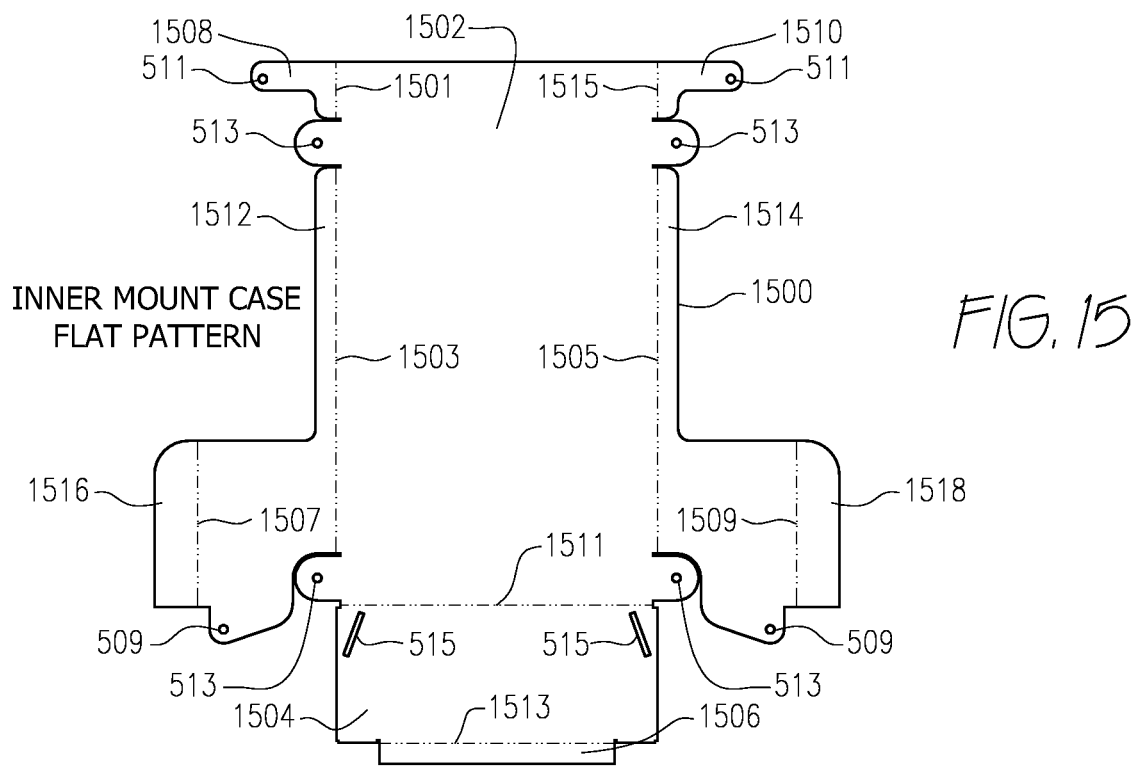
FIG. 15 a flat pattern for making the inner mount case shown in FIG. 14.

FIG. 14 a perspective view of the inner mount case 508 shown in FIG. 8. FIG. 15 is a flat pattern 1500 for making the inner mount case 508 shown in FIG. 14. Inner mount case 508 may be fabricated from a sheet of metal that has been cut, e.g., with a metal saw, metal cutting stamp or metal cutting laser, in the shape, or pattern, shown in FIG. 15 at 1500.

As shown in FIG. 15, a piece of sheet metal cut in accordance with pattern 1500 includes a left front side 1516, a left side 1512, a left upper flange 1508, a back side 1502, a bottom side 1504, a front lip 1506, a right upper flange 1510, a right side 1514, and a right front side 1518. Left front side 1516 is separated from left side 1512 by fold line 1507. Left side 1512 is separated from back side 1502 by fold line 1503. Left upper flange 1508 is separated from back side 1502 by fold line 1501. Bottom side 1504 is separated from back side 1502 by fold line 1511. Right upper flange 1510 is separated from back side 1502 by fold line 1515. Right side 1514 is separated from back side 1502 by fold line 1505. Right front side 1518 is separated from right side 1514 by fold line 1509.

Left side 1512 and right side 1514 each include a through hole 509. Left upper flange 1508 and right upper flange 1510 each include a through hole 511. Back side 1502 includes through holes 513. Bottom side 1504 includes slots 515. Folding each identified side and each identified flange along the respective identified fold lines in a common direction towards back side 1502 results in an inner mount case 508, as shown in FIG. 7 and FIG. 8.

Figure 16:
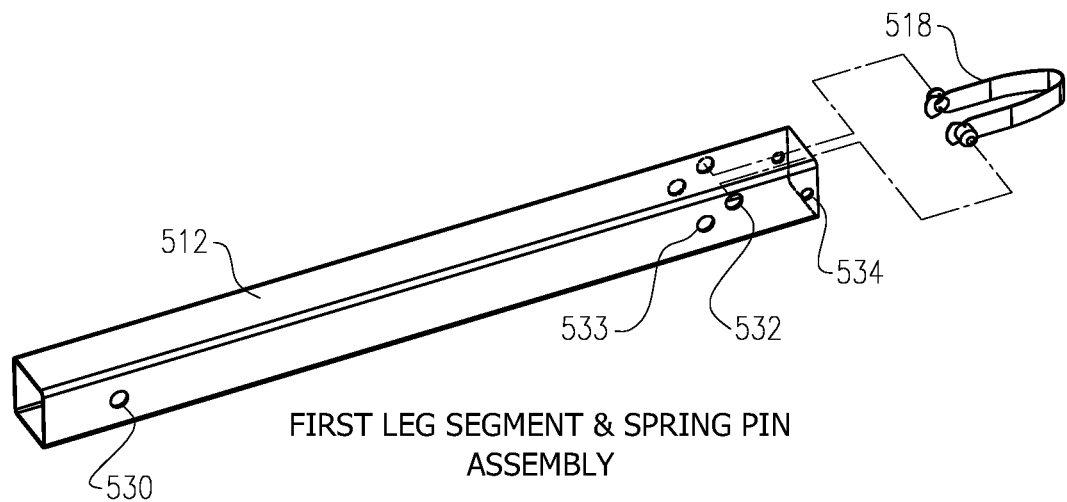
FIG. 16 is an exploded perspective view of the first leg segment and spring pin assembly shown in FIG. 6.
Figure 17:
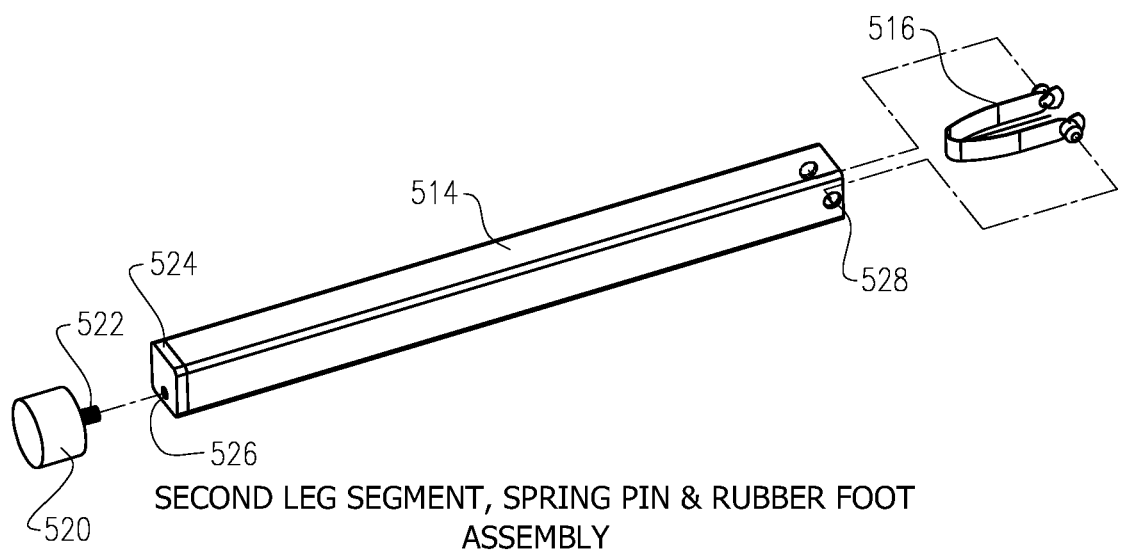
FIG. 17 is an exploded perspective view of the second leg segment and spring pin and rubber foot assembly shown in FIG. 6.

FIG. 16 is an exploded perspective view of the first leg segment and spring pin assembly shown in FIG. 6. FIG. 17 is an exploded perspective view of the second leg segment and spring pin and rubber foot assembly shown in FIG. 6. FIG. 18 is a plan view of the first leg segment shown in FIG. 16. FIG. 19 is a plan view of the second leg segment shown in FIG. 17.

Although features associated with a telescoping leg assembly 510 are described above with respect to FIG. 6, FIGS. 16-19 show a few additional details not previously described. The pins of double ended spring pin 518 are aligned with and engaged with through holes 532 in first leg segment 512. Spring pin 518 provides for releasably locking the leg at different angles with respect to the case by interaction with through holes 546 and 550 in the leg base flanges. The pins of double ended spring pin 516 are aligned with and are engaged with through holes 528 in second leg segment 514. Spring pin 516 provides for releasably locking the legs 510 in an extended or contracted configuration by interaction with through holes 530 and 533 in the first leg segment 512. In addition, FIG. 17 shows that second leg segment 514 is capped with end plate 524; end plate 524 includes a threaded through hole 526 that receives a threaded rod 522 of a stabilizing foot 520, thereby allowing the farthest end of telescoping leg assembly 510 to terminate in a stabilizing foot.

Figure 20:
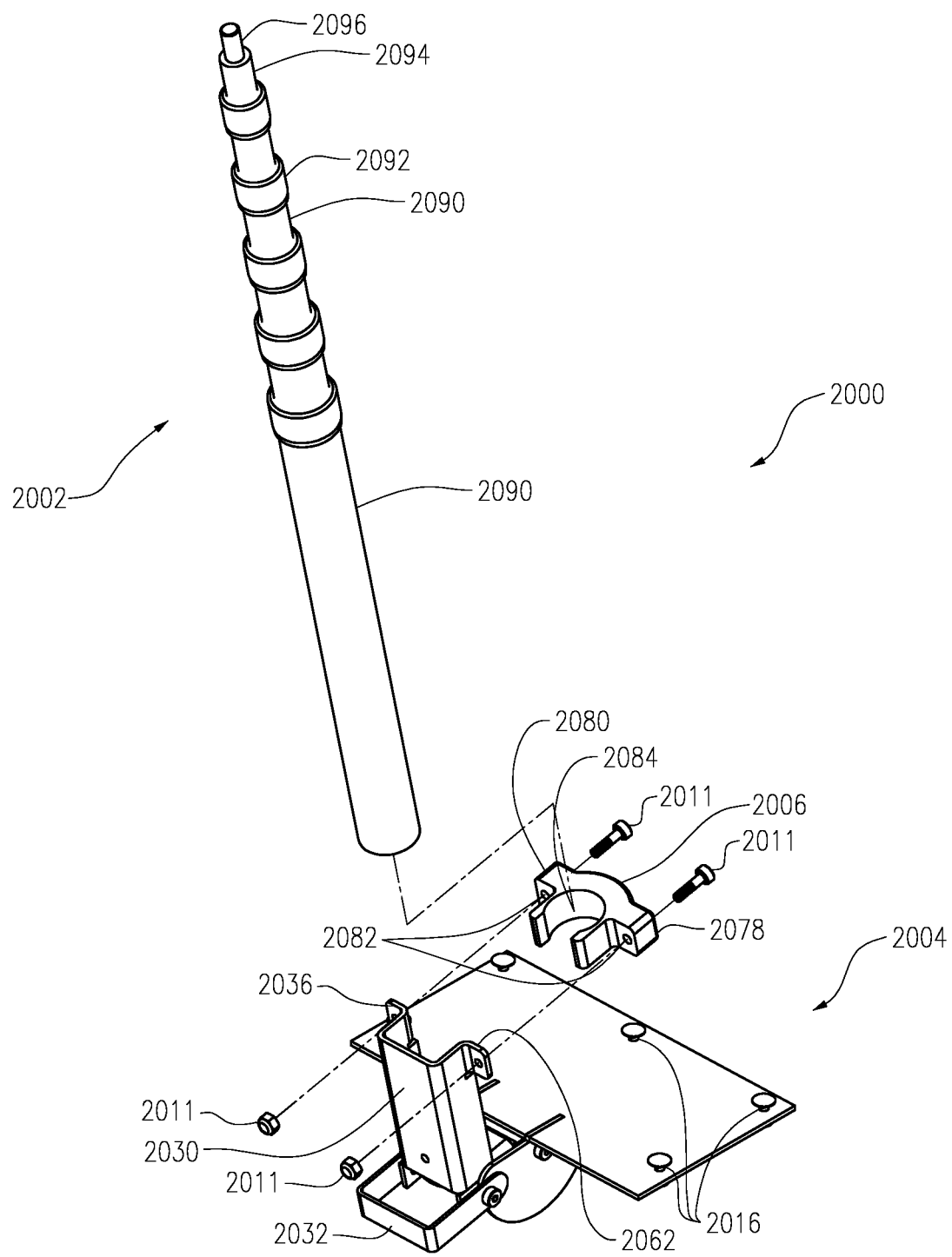
FIG. 20 is an exploded perspective view of the telescoping mast support assembly shown in FIG. 4.

FIG. 20 is an exploded perspective view of the mast support assembly shown in FIG. 4. As shown in FIG. 20, mast support assembly 2000 includes a telescoping mast 2002, a mast pivot support assembly 2004, and a mast clamp 2006.

As shown in FIG. 20, telescoping mast 2002 includes multiple telescoping sections 2090. Each successive telescoping section 2090 in telescoping mast 2002 has a successively smaller outside diameter than a previous, or lower, telescoping section 2090 in telescoping mast 2002, thereby allowing the telescoping sections to be arranged in a telescoping configuration. Each telescoping section 2090 includes a gripping portion 2092 that may be tightened to securely grip a next telescoping section in telescoping mast 2002. A top telescoping section 2094 terminates in a junction rod 2096 which may be, for example, a solid threaded rod capable of receiving a threaded nut, or a tapped threaded rod capable of receiving a bolt. Junction rod 2096 is used to attach various functional devices and/or assemblies to the raised end of telescoping mast 2002, as described in greater detail below.

As further shown in FIG. 20, telescoping mast 2002 is attached, e.g., clamped, to a mast support bracket assembly 2030 of mast pivot support assembly 2004 by mast clamp 2006 and fasteners. For example, flange 2080 of mast clamp 2006 is secured to flange 2036 of mast support bracket assembly 2030 with a bolt 2011, flange 2078 of mast clamp 2006 is secured to flange 2062 of mast support bracket assembly 2030 with a bolt 2011, thereby allowing telescoping mast 2002 to be securely held within a mast retaining bracket 2084 of mast clamp 2006.

Figure 21:
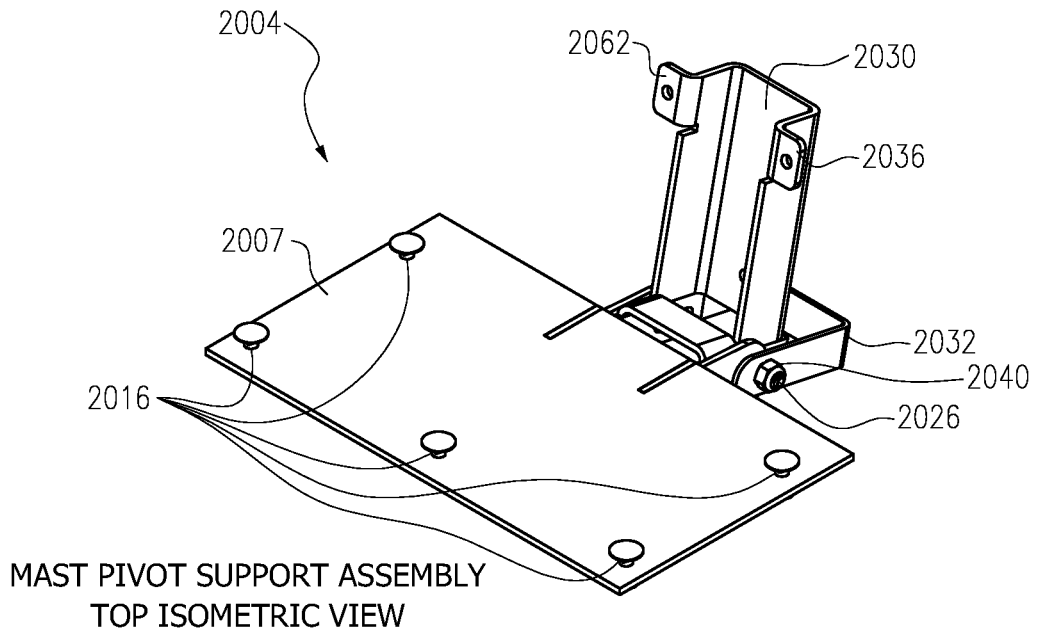
FIG. 21 is a top perspective view of the mast pivot support assembly shown in FIG. 20 (1/3 scale).
Figure 22:
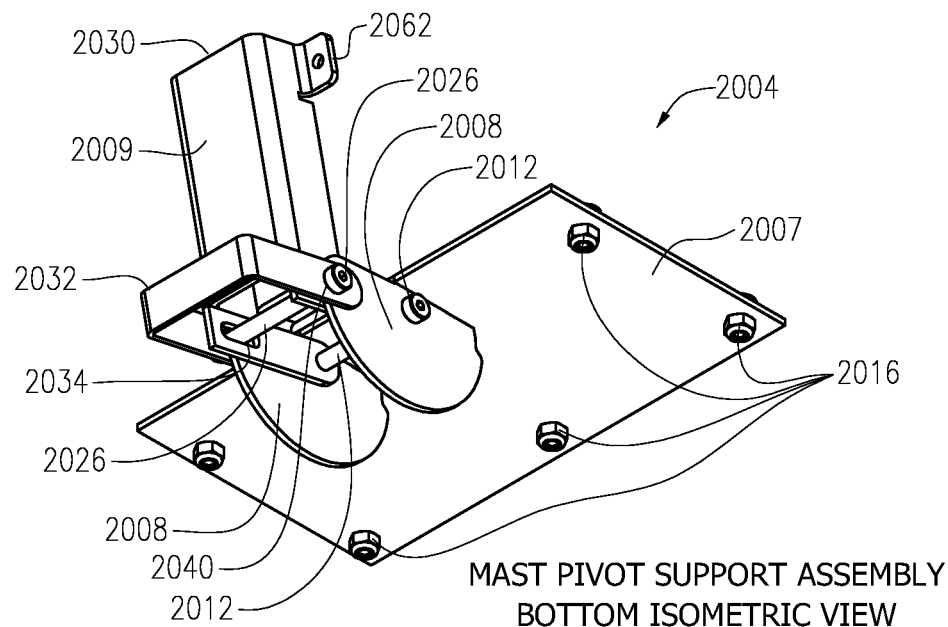
FIG. 22 is a bottom perspective view of the mast pivot support assembly shown in FIG. 20.

FIG. 21 is a top perspective view of a mast pivot support assembly of the telescoping support assembly shown in FIG. 20. FIG. 22 is a bottom perspective view of a mast pivot support assembly of the telescoping support assembly shown in FIG. 20. FIG. 21 and FIG. 22 show expanded images of parts of mast pivot support assembly 2004.

Referring to FIG. 21, mast pivot lock pull handle 2032 is held to mast support bracket assembly 2030 by position adjusting bolt 2026, which passes through round through holes 2040 in mast pivot lock pull handle 2032 and elongated through holes 2034 in mast support bracket assembly 2030. As shown in FIG. 22, mast support bracket assembly 2030 is adjustably attached to a pair of mast pivot guides 2008 with position adjusting bolt 2026 and pivot bolt 2012, as described in greater detail below.

Figure 23:
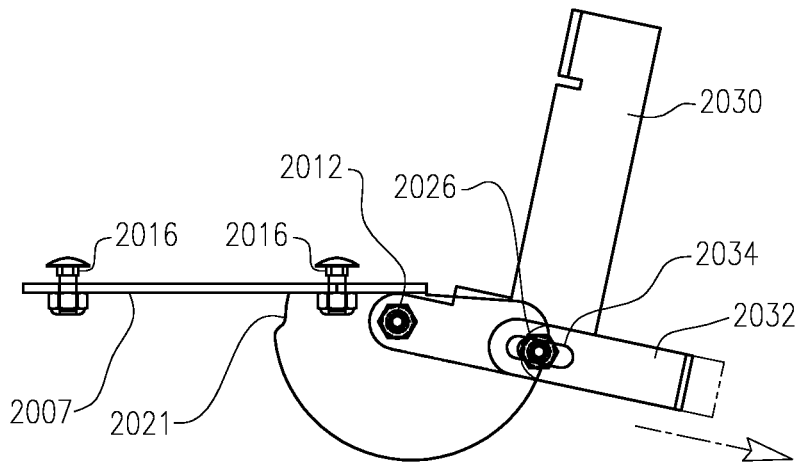
FIG. 23 is side view of the mast pivot support assembly of FIG. 20 in a locked "UP" position (1/2 scale).
Figure 24:
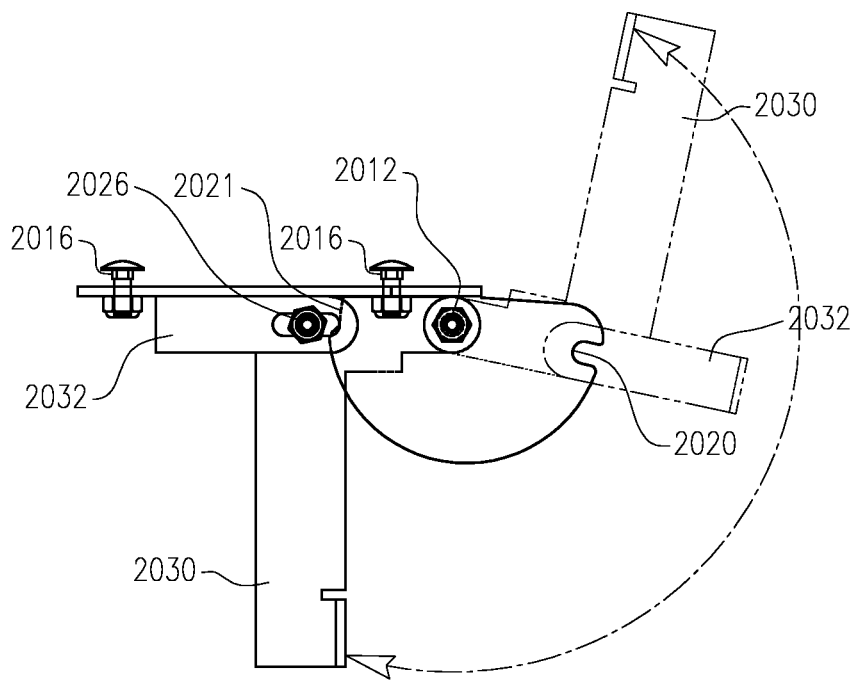
FIG. 24 is side view of the mast pivot support assembly of FIG. 20 in a locked "DOWN" position.

FIG. 23 is side view of the mast pivot support assembly 2004 of FIG. 20 in a locked "UP" position. FIG. 24 is side view of the mast pivot support assembly 2004 of FIG. 20 that has been repositioned from a locked "UP" position to a locked "DOWN" position. As shown in FIG. 23 and FIG. 24 mast support bracket assembly 2030 pivots about pivot bolt 2012. Pulling mast pivot lock pull handle 2032 in the direction of the arrow shown in FIG. 23, disengages position adjusting bolt 2026 from catch groove 2020 in mast pivot guide 2008, allowing mast pivot lock pull handle 2032 and mast support bracket assembly 2030 to pivot about pivot bolt 2012 until position adjusting bolt 2026 is aligned with and engages catch groove 2021 in mast pivot guide 2008. Although not shown, a tension spring 2022, between pivot bolt 2012 and position adjusting bolt 2026 is used to hold and bias position adjusting bolt 2026 within catch groove 2020 when mast pivot support assembly 2004 is locked in the "UP" position, and is used to hold position adjusting bolt 2026 within catch groove 2021 when mast pivot support assembly 2004 is locked in the "DOWN" position. To rotate mast pivot support assembly 2004 from a first locked position to a second locked position, mast pivot lock pull handle 2032 is pulled to overcome the tension on tension spring 2022, thereby dislodging position adjusting bolt 2026 from a first catch groove and allowing mast support bracket assembly 2030 and mast pivot lock pull handle 2032 to rotate about pivot bolt 2012 until adjusting bolt 2026 is aligned with and engages a second catch groove with tension supplied by tension spring 2022.

Figure 25:
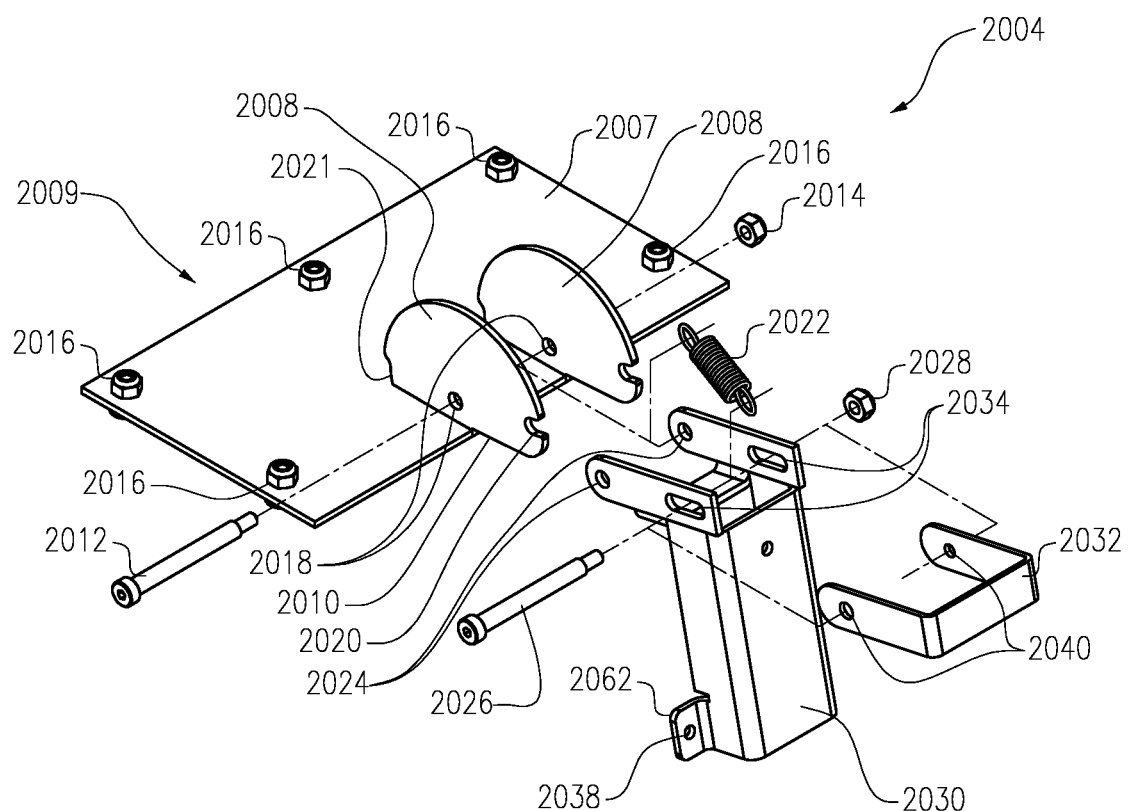
FIG. 25 is an exploded perspective view of the mast pivot support assembly of FIG. 20 (1/3 scale).

FIG. 25 is an exploded perspective view of the mast pivot support assembly of FIG. 20. As shown in FIG. 25, mast pivot support assembly 2004 includes a mast support top assembly 2009 and a mast support bracket assembly 2030. Through holes 2024 in mast support bracket assembly 2030 are aligned with through holes 2018 in mast support top assembly 2009 and pivot bolt 2012 is inserted through the aligned holes to connect mast support top assembly 2009 to mast support bracket assembly 2030.

Round through holes 2040 in mast pivot lock pull handle 2032 are aligned with elongated through holes 2034 in mast support bracket assembly 2030 and position adjusting bolt 2026 is inserted through the aligned holes to connect mast pivot lock pull handle 2032 to mast support bracket assembly 2030.

Tension spring 2022 is positioned between position pivot bolt 2012 and adjusting bolt 2026 with pivot bolt 2012 passing through a first looped end of tension spring 2022 and adjusting bolt 2026 passing through a second looped end of tension spring 2022. As described above, tension from tension spring 2022 is used to selectively engage adjusting bolt 2026 with one of catch groove 2020 and catch groove 2021 to lock mast support bracket assembly 2030 in one of an "UP" position and a "DOWN" position.

FIG. 26 is an exploded perspective view of the mast support top assembly 2009 shown in FIG. 25. FIG. 27 is a perspective view of the mast assembly mounting plate shown in FIG. 26. FIG. 28 is a plan view of a mast pivot guide 2008 shown in FIGS. 20 to 26.

As shown in FIG. 27, mast assembly mounting plate 2007 includes a first slot 2044, a second slot 2042 and multiple through holes 2046. As shown in FIG. 28, mast pivot guide 2008 includes catch groove 2020, catch groove 2021, tab 2048 and through hole 2018. As shown in FIG. 26, a first mast pivot guide 2008 is attached to mounting plate 2007 by securing tab 2048 of the mast pivot guide into slot 2042 of mounting plate 2007 such that catch groove 2020 is pointed away from mounting plate 2007, and a second mast pivot guide 2008 is attached to mounting plate 2007 by securing tab 2048 of the mast pivot guide into slot 2044 of mounting plate 2007 such that catch groove 2020 is pointed away from mounting plate 2007.

Figure 29:
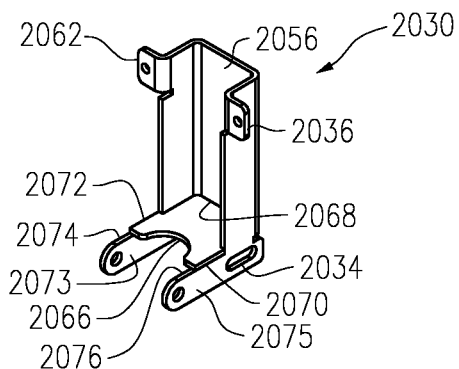
FIG. 29 is a perspective view of the mast support bracket assembly shown in FIG. 25 (1/4 scale).
Figure 30:
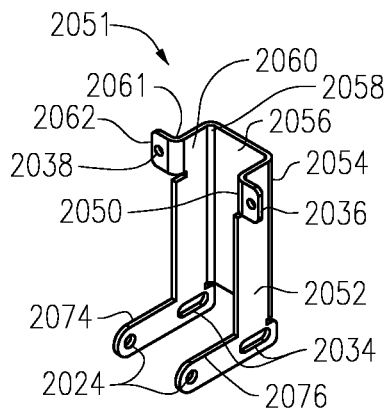
FIG. 30 is a perspective view of the mast support bracket shown in FIG. 29.
Figure 31:
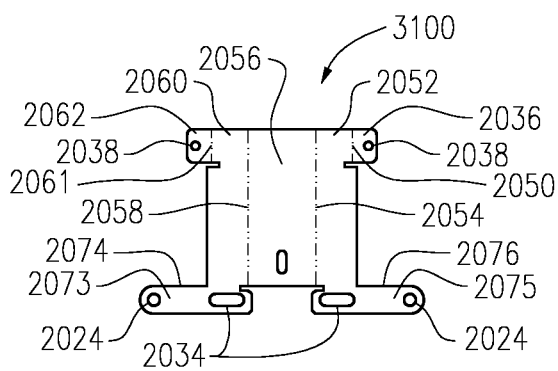
FIG. 31 is a flat pattern for making the mast support bracket shown in FIG. 30.
Figure 32:
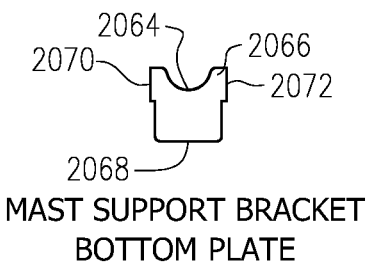
FIG. 32 is a plan view of the mast support bracket bottom plate shown in FIG. 29.

FIG. 29 is a perspective view of the mast support bracket assembly shown in FIG. 25. FIG. 30 is a perspective view of the mast support bracket shown in FIG. 29. FIG. 31 is a flat pattern for making the mast support bracket shown in FIG. 30. FIG. 32 is a plan view of the mast support bracket bottom plate shown in FIG. 29.

As shown in FIGS. 29 to 32, mast support bracket assembly 2030 includes a mast support bracket 2051 (FIG. 30) and a mast support bracket bottom plate 2066 (FIG. 32).

As shown in FIG. 31, mast support bracket 2051 may be fabricated from a sheet of material 3100 (e.g., metal) that has been cut, e.g., with a metal saw, metal cutting stamp or metal cutting laser, in the shape or pattern shown.

As shown in FIG. 31, a piece of materiel, e.g., sheet metal, cut in accordance with pattern 3100 includes a right upper flange 2062, a right side 2060 with protruding right lower flange 2073, a back side 2056, a left side 2052 with protruding left lower flange 2075 and a left upper flange 2036. Right lower flange 2073 and left lower flange 2075 each include a round through hole 2024 and an elongated through hole 2034. Right upper flange 2062 is separated from right side 2060 by a fold line 2061. Right side 2060 is separated from back side 2056 by a fold line 2058. Back side 2056 is separated from left side 2052 by a fold line 2054. Left upper flange 2036 is separated from left side 2052 by a fold line 2050.

As shown in FIG. 30 and FIG. 31, to form mast support bracket 2051 from a piece of sheet metal cut in accordance with pattern 3100, right side 2060 is folded along fold line 2058 ninety degrees towards back side 2056, right upper flange 2062 is folded along fold line 2061 ninety degrees away from back side 2056, left side 2052 is folded along fold line 2054 ninety degrees towards back side 2056 and left upper flange 2036 is folded along fold line 2050 ninety degrees away from back side 2056.

As shown in FIG. 29 and FIG. 32, a mast support bracket assembly 2030 is formed by securing a mast support bracket bottom plate 2066 on mast support bracket 2051 such that a back edge 2068 of mast support bracket bottom plate 2066 is in contact with back side 2056 of mast support bracket 2051, tab 2070 of mast support bracket bottom plate 2066 is in contact with an upper edge 2076 of lower flange 2075 of mast support bracket 2051, and tab 2072 of mast support bracket bottom plate 2066 is in contact with an upper edge 2074 of left lower flange 2073 of mast support bracket 2051.

Figure 33:
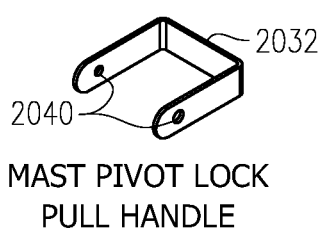
FIG. 33 is a perspective view of the mast pivot lock pull handle shown in FIG. 25.

FIG. 33 is a perspective view of a mast pivot lock pull handle, as shown in FIG. 25. As shown in FIG. 33, a mast pivot lock pull handle 2032 is formed of a rigid strap of sheet metal with two 90 degree bends. Through holes 2040 are formed in each end of mast pivot lock pull handle 2032 to allow attachment to mast support bracket assembly 2030, as described above.

Figure 34:
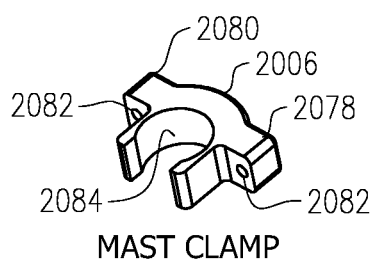
FIG. 34 is a perspective view of the mast clamp shown in FIG. 20.

FIG. 34 is a perspective view of the mast clamp shown in FIG. 20. As shown in FIG. 34, a mast clamp 2006 may be cast and/or milled from metal and includes flange 2078, flange 2080, through holes 2082 and mast retaining bracket 2084, that allow mast clamp 2006 to clamp telescoping mast 2002 to mast support bracket assembly 2030, as described above with respect to FIG. 20.

Figure 35:
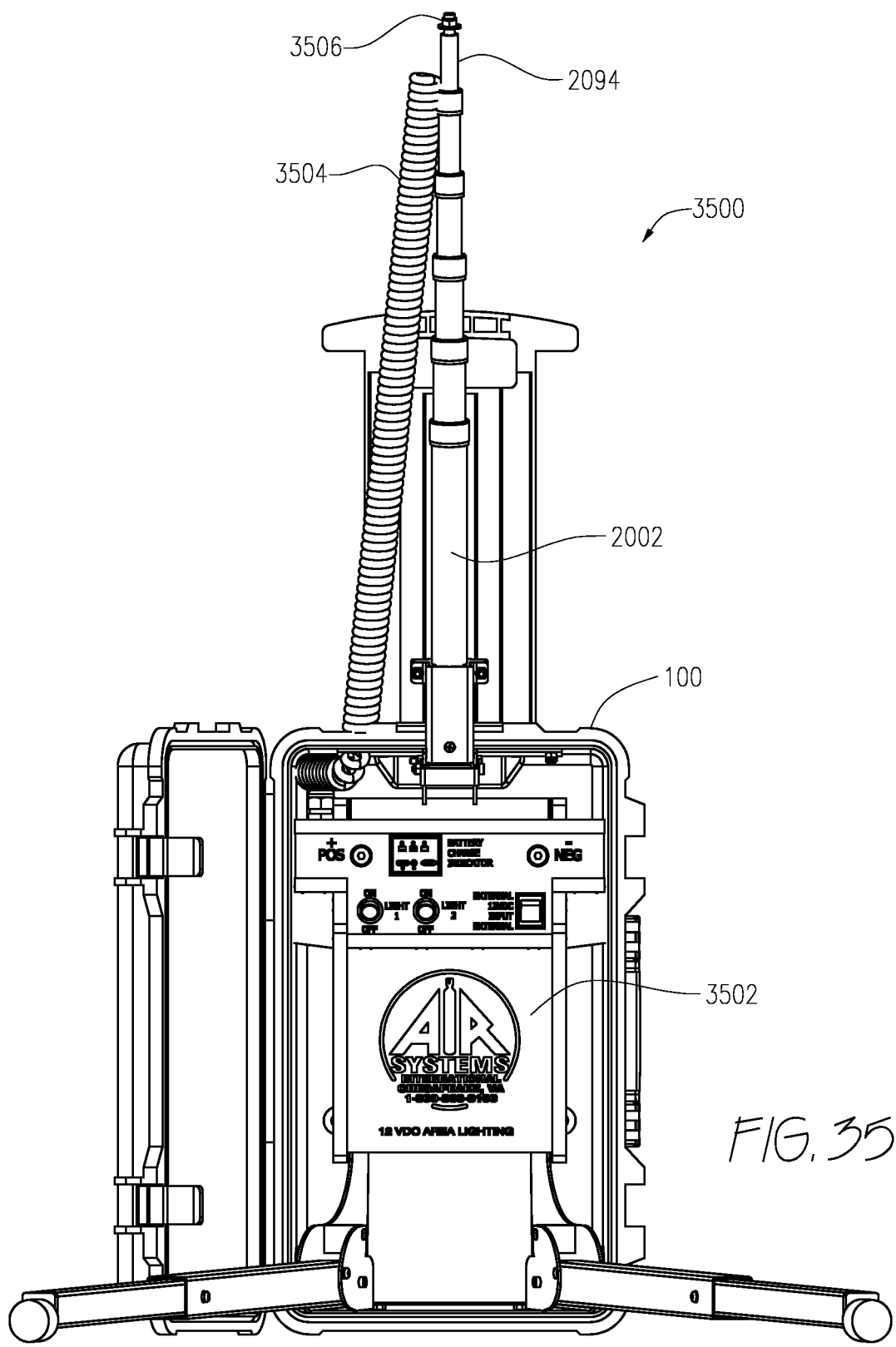
FIG. 35 is a front plan view of a second exemplary embodiment of a collapsible portable stand with extendible legs, a telescoping support and an integral storage case that has been equipped with a hinged lighting control system (3/8 scale).

FIG. 35 is a front elevation view of a second exemplary embodiment of a collapsible portable stand with telescoping support and integral storage case in accordance with the present invention. As shown in FIG. 35, portable power control system 3500 includes collapsible portable stand 100, as described above with respect to FIG. 1, a power delivery controller 3502 and an extendable and retractable power/control cable 3504.

Power delivery controller 3502 may deliver electrical power and/or control signals via power/control cable 3504 to a functional device or devices mounted on the mast, e.g., electrical devices such as but not limited to lights, speakers, cameras, survey equipment (e.g., laser sight), podium, microphones, weapons, lasers, sensors, monitors, etc. Functional devices can be attached to the top telescoping section 2094 of telescoping mast 2002 via, for example, threaded accessory attachment bolt 3506.

It is noted that although power delivery controller 3502, shown in FIG. 35, is a 12-volt DC based system, embodiments of the present invention are not limited to use with a 12-volt DC based systems. For example, power delivery controller 3502 may be selected based on the electric power and conditioning requirements of electrical device(s) mounted on telescoping mast 2002.

Figure 36:
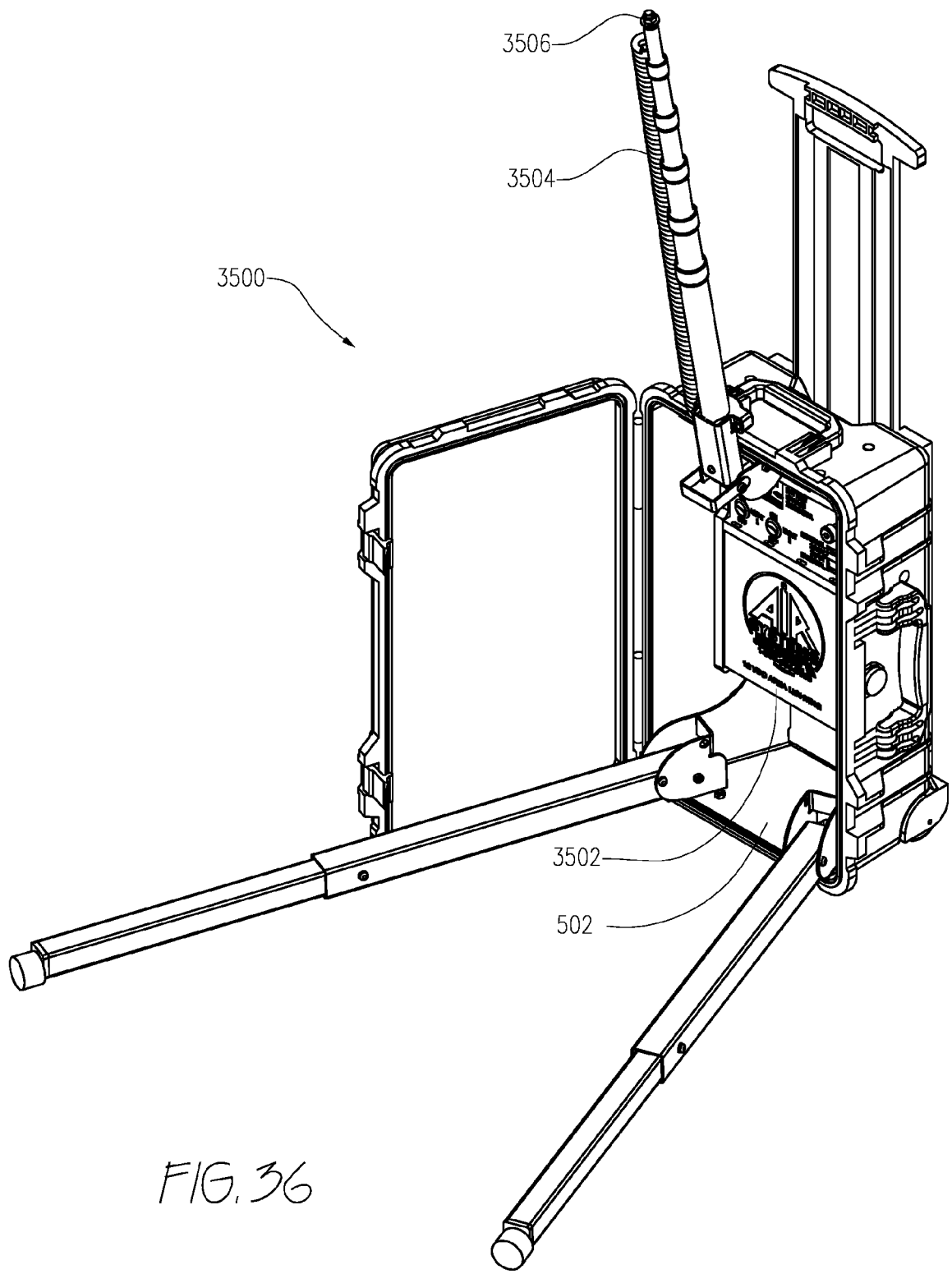
FIG. 36 is a top-angled perspective front view of the collapsible portable stand shown in FIG. 35 (3/16 scale).

FIG. 36 is a top-angled perspective front view of the collapsible portable stand shown in FIG. 35.

Figure 37:
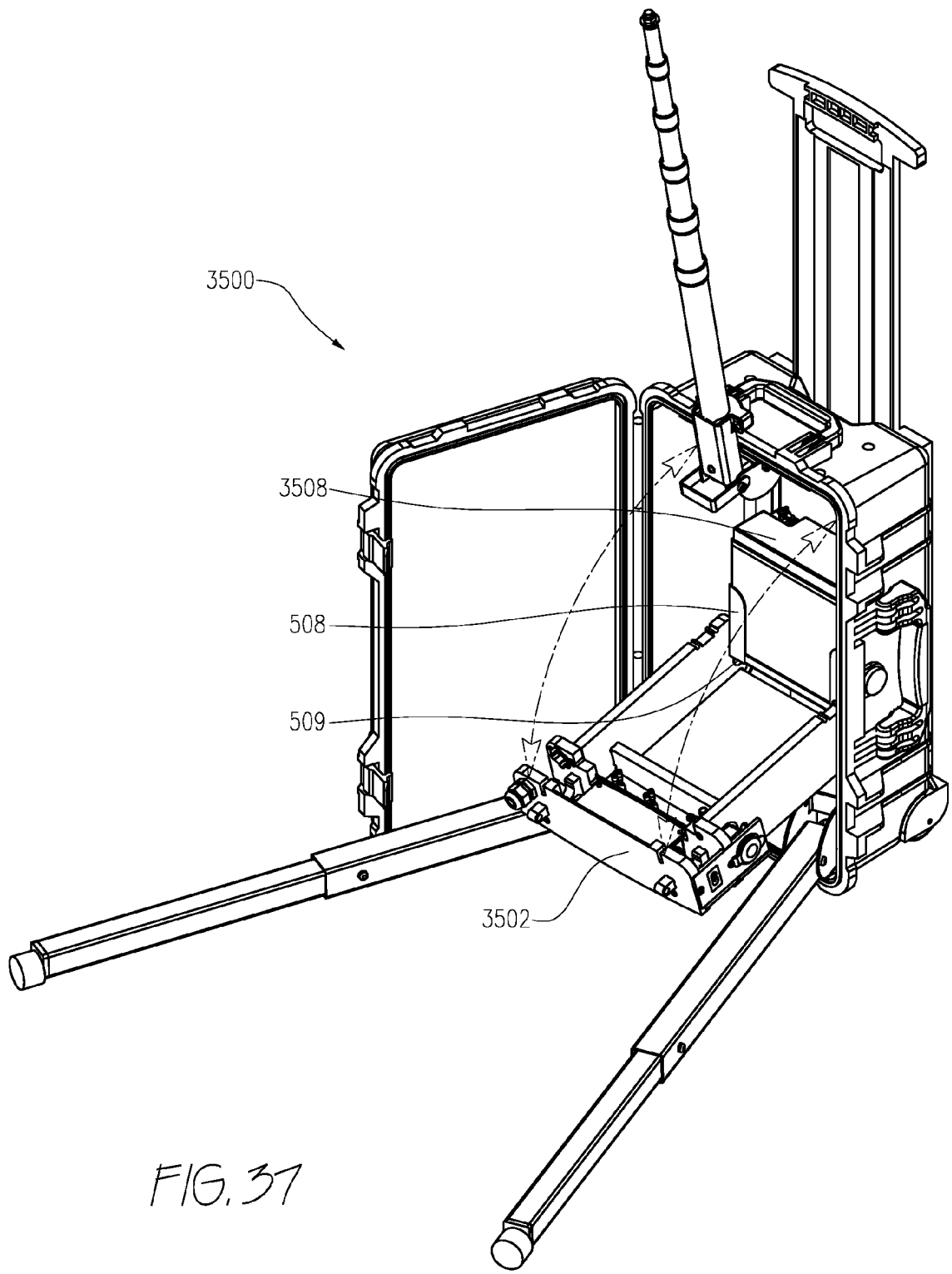
FIG. 37 is a top-angled perspective front view of the collapsible portable stand shown in FIG. 36 in which the hinged lighting control system panel has been placed in an open position.

FIG. 37 is a top-angled perspective front view of the collapsible portable stand shown in FIG. 36 in which the power delivery controller 3502 is hinged at the base where power delivery controller 3502 is attached to inner mount case 508, thus forming a cover and retention device for the contents of inner mount case 508. As shown in FIG. 37, power delivery controller 3502 pivots from an up, or closed, position, to a down, or open position. Pivoting power delivery controller 3502 to an open position reveals a battery 3508 stored in, and held by, inner mount case 508. In an embodiment, power delivery controller 3502 is attached to inner mount case 508 via a pivot pin, not shown, which passes through a through hole in the case of power delivery controller 3502 and through hole 509 in inner mount case 508. In place of and/or in addition to a power source stored in case 508, other devices may be stored and/or connected thereto; for example, microprocessors and/or a computer with transmitting and/or receiver capabilities for remote control and monitoring may be included and/or connected to the case 200.

Figure 38:
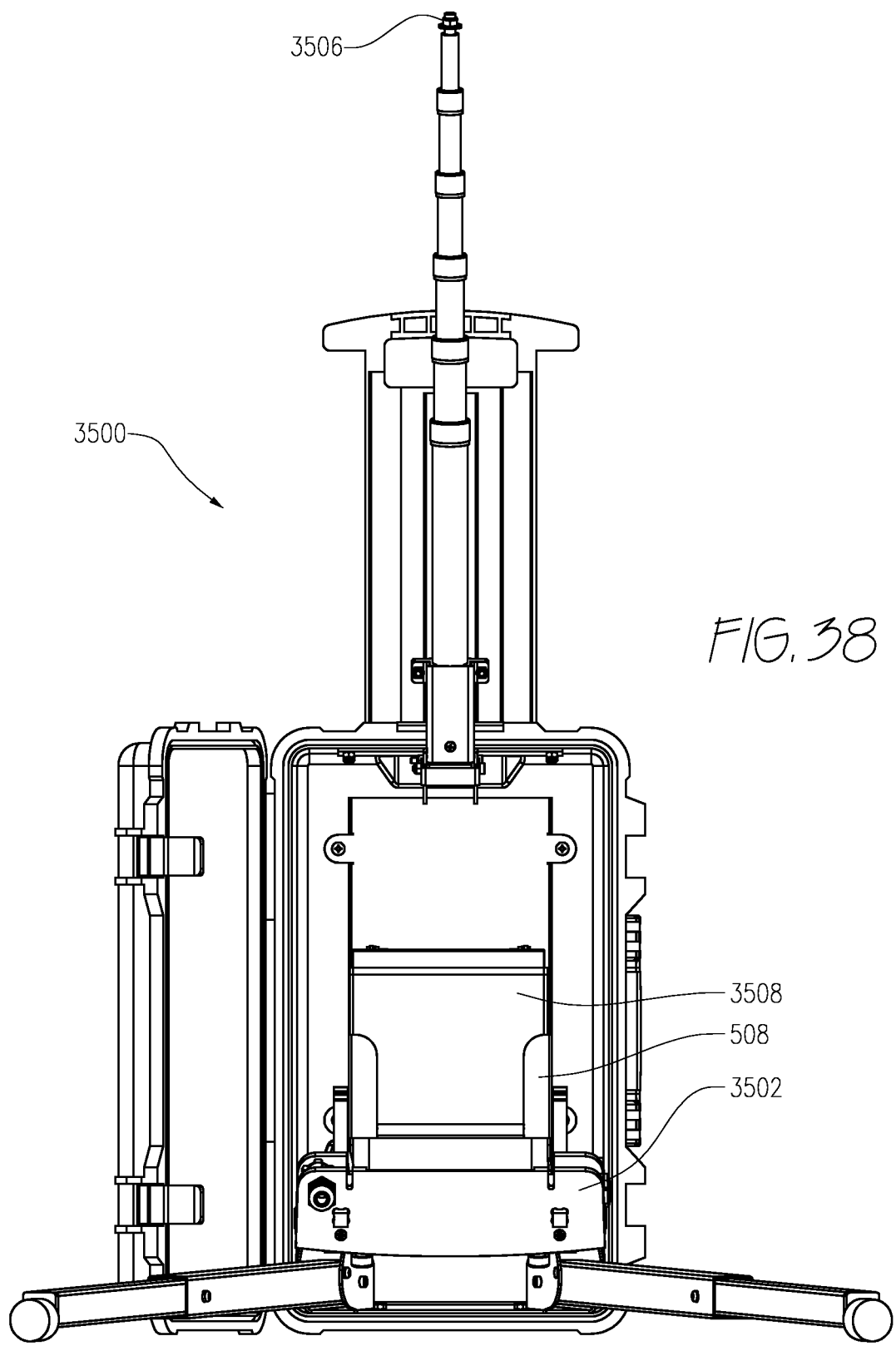
FIG. 38 is a front elevation view of the collapsible portable stand shown in FIG. 37 (3/8 scale); the inner control panel or cover for the interior case is shown in an open position.

FIG. 38 is a front plan view of the collapsible portable stand shown in FIG. 37 in which the hinged cover for the inner mount case 508 has been placed in an open position showing a storage tray therein. The cover for inner mount case 508 may include securing bolts to remain closed whether or not the outer case door 202 is open, although case door 202 may be sufficient in many instances to secure closure of inner mount case 508 and/or to hold desired items in inner mount case 508 without having a separate cover therefore.

Figure 39:
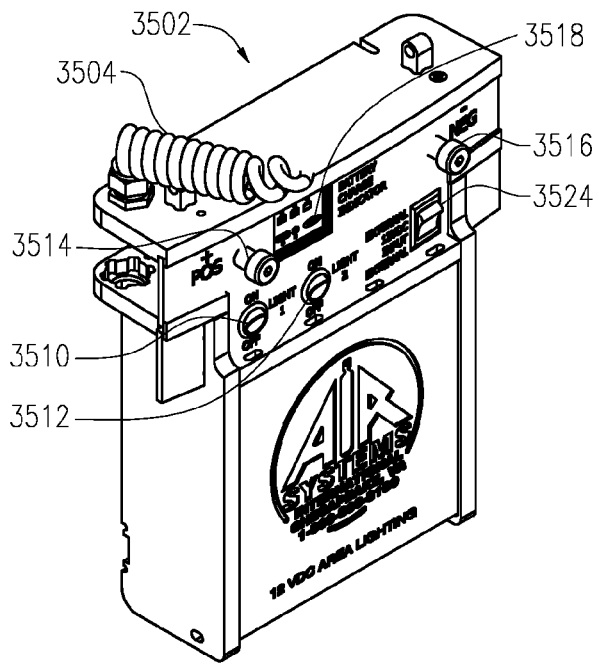
FIG. 39 is a top-angled perspective front view of the lighting control system shown in FIG. 35 (1/4 scale), which is incorporated into the cover panel for the interior case.
Figure 40:
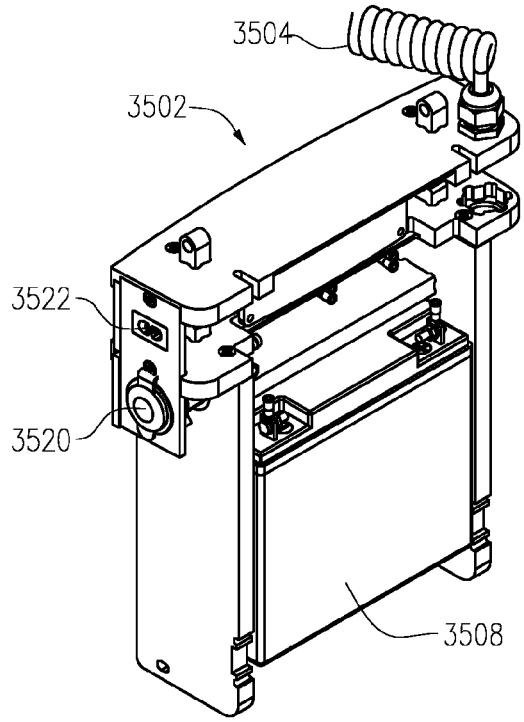
FIG. 40 is a top-angled perspective rear view of the lighting control system shown in FIG. 35.
Figure 41:
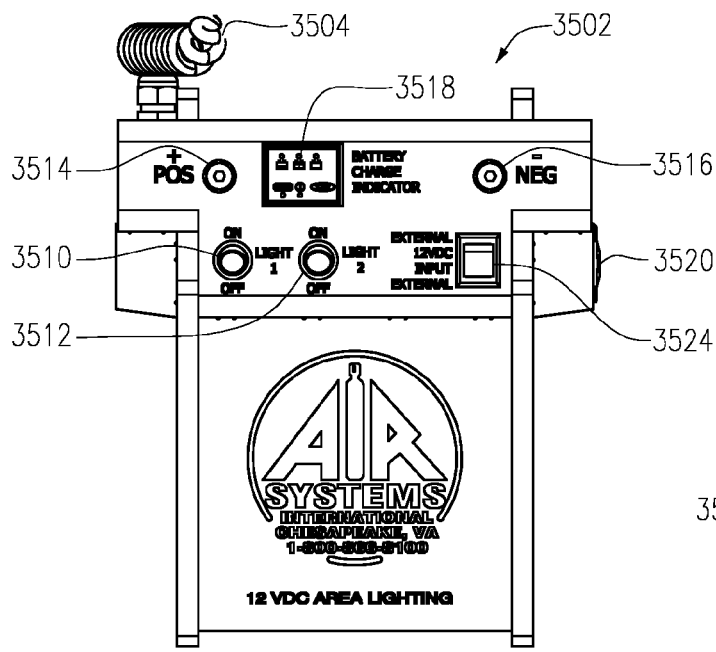
FIG. 41 is a front elevation view of the lighting control system shown in FIG. 35.
Figure 42:
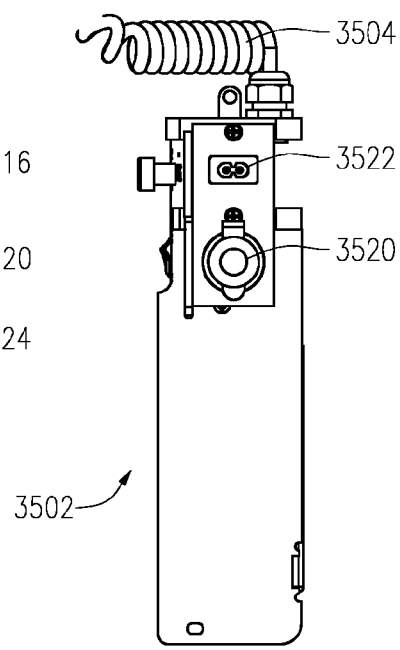
FIG. 42 is a side elevation view of the lighting control system shown in FIG. 35.

FIG. 39 is a top-angled perspective front view of the power supply controller embodiment 3502 shown in FIG. 35. FIG. 40 is a top-angled perspective rear view of controller 3502, while FIG. 41 is a front plan view and FIG. 42 is a side plan view thereof.

As shown in FIGS. 39-42, controller 3502 includes a first power control switch 3510, a second power control switch 3512, a positive terminal 3514, a negative terminal 3516, a status indicator 3518, a first power inlet/outlet 3520, a second power inlet 3522, and an internal/external power supply switch 3524. First power control switch 3510 may be used to control power to a first electrical device mounted on telescoping mast 2002. Second power control switch 3512 may be used to control power to a second electrical device mounted on telescoping mast 2002. Positive terminal 3514 and negative terminal 3516 can receive power from an external power source, e.g., via a set of cables, not shown. Status indicator 3518 may provide a status of battery 3508, if such a battery is provided, and internal/external power supply switch 3524 may be used to configure power delivery controller 3502 to deliver electrical power to electrical devices mounted on telescoping mast 2002 from battery 3508 or from an external power source, not shown. A battery in case 508 may be recharged via connections in the control panel. A solar panel for generating electricity may be incorporated into or onto the case and/or connected to the mast. Power outlet 3520 may be used to provide electrical power to ancillary equipment, e.g., communication equipment and/or computing devices. Should electromechanical actuators be used to manipulate the orientation (e.g., azimuth, rotation, height, precession about an axis, etc.) of functional devices, power sources can be shared via cables run through the center of the mast or via flexible, sealed pinch-free conduits with intrinsically safe fittings.

Hence, the present invention can provide a stable, self-contained platform that can be readily transported and set up and collapsed in remote locations for a variety of functional devices. With pivots and extensor hardware operable by tactile "touch, press and pull" action, the stand can be set up and collapsed in the dark. With intrinsically safe electric power and electric devices, systems can incorporate the platform for facile deployment and use in a variety of situations.

Figure 43:
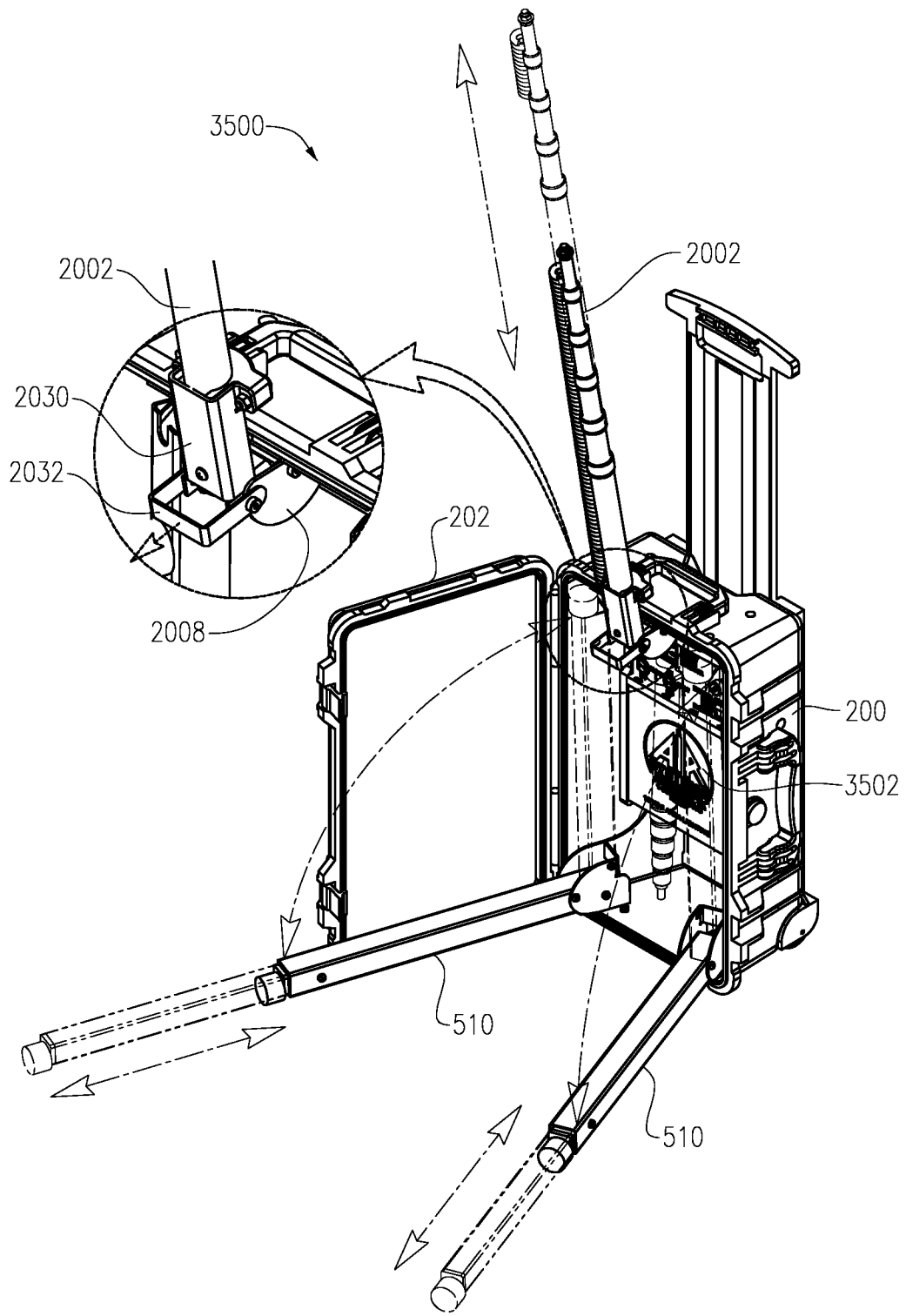
FIG. 43 is a top-angled perspective front view of the collapsible portable stand shown in FIG. 36 that demonstrates the degrees of freedom of motion supported by the leg assemblies and telescoping support of the portable stand.
Figure 44:
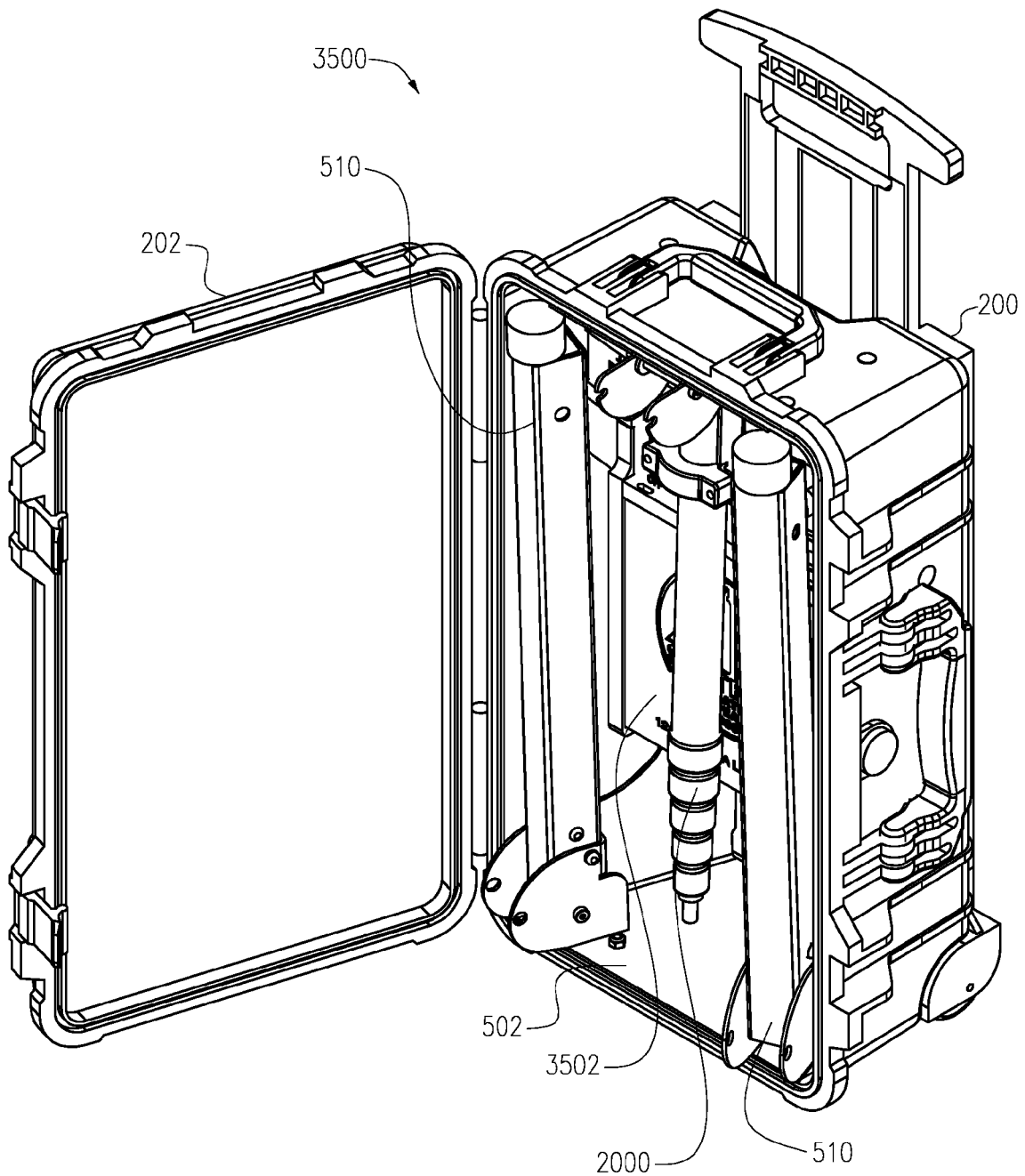
FIG. 44 is a top-angled perspective front view of the collapsible portable stand shown in FIG. 43 in which the leg assemblies and telescoping support have been contracted and folded into the integral storage case.

FIG. 43 is a top-angled perspective front view of the collapsible portable stand 3500 shown in FIG. 36, which demonstrates the degrees of freedom of motion for the leg assemblies and mast. FIG. 44 is a top-angled perspective front view of the collapsible portable stand shown in FIG. 43 in which the leg assemblies and mast have been contracted and folded into the integral storage case. As shown in FIG. 43 and FIG. 44, since the power delivery controller 3502 is confined within inner mount case 508, each leg assembly 510 and telescoping mast 2002 can be retracted and can be folded into interior space 224 of case 200, thereby allowing exterior door 202 to be secured, as described above with respect to FIG. 2 and FIG. 3.

Figure 45:
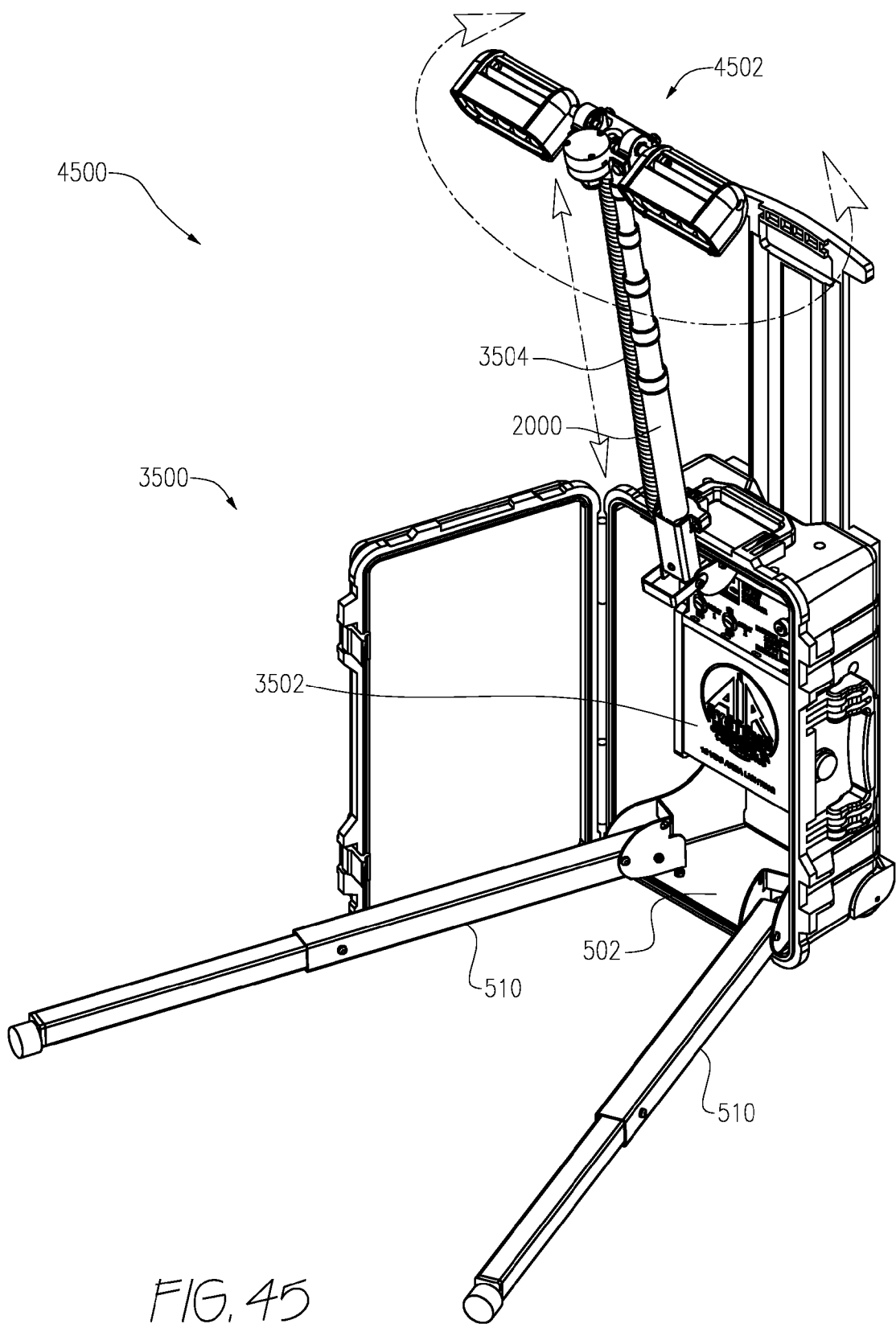
FIG. 45 is a top-angled perspective front view of a third exemplary embodiment of a collapsible portable stand with extendible leg assemblies, a telescoping support and an integral storage case, in which a lighting assembly has been attached to the extended telescoping support.

FIG. 45 is a top-angled perspective front view of a third exemplary embodiment of the present inventions. As shown in FIG. 45, portable lighting system 4500 includes collapsible portable stand 100, as described above with respect to FIG. 1, a power delivery controller 3502 and a power/control cable 3504, as described above with respect to FIG. 35-44, and a lighting assembly 4502, that is attached an extended end of telescoping mast 2002 and electrically connected to power delivery controller 3502 via cable 3504. Lighting assembly 4502 is attached to top telescoping section 2094 of telescoping mast 2002 by a threaded accessory attachment bolt 3506.

Figure 46:
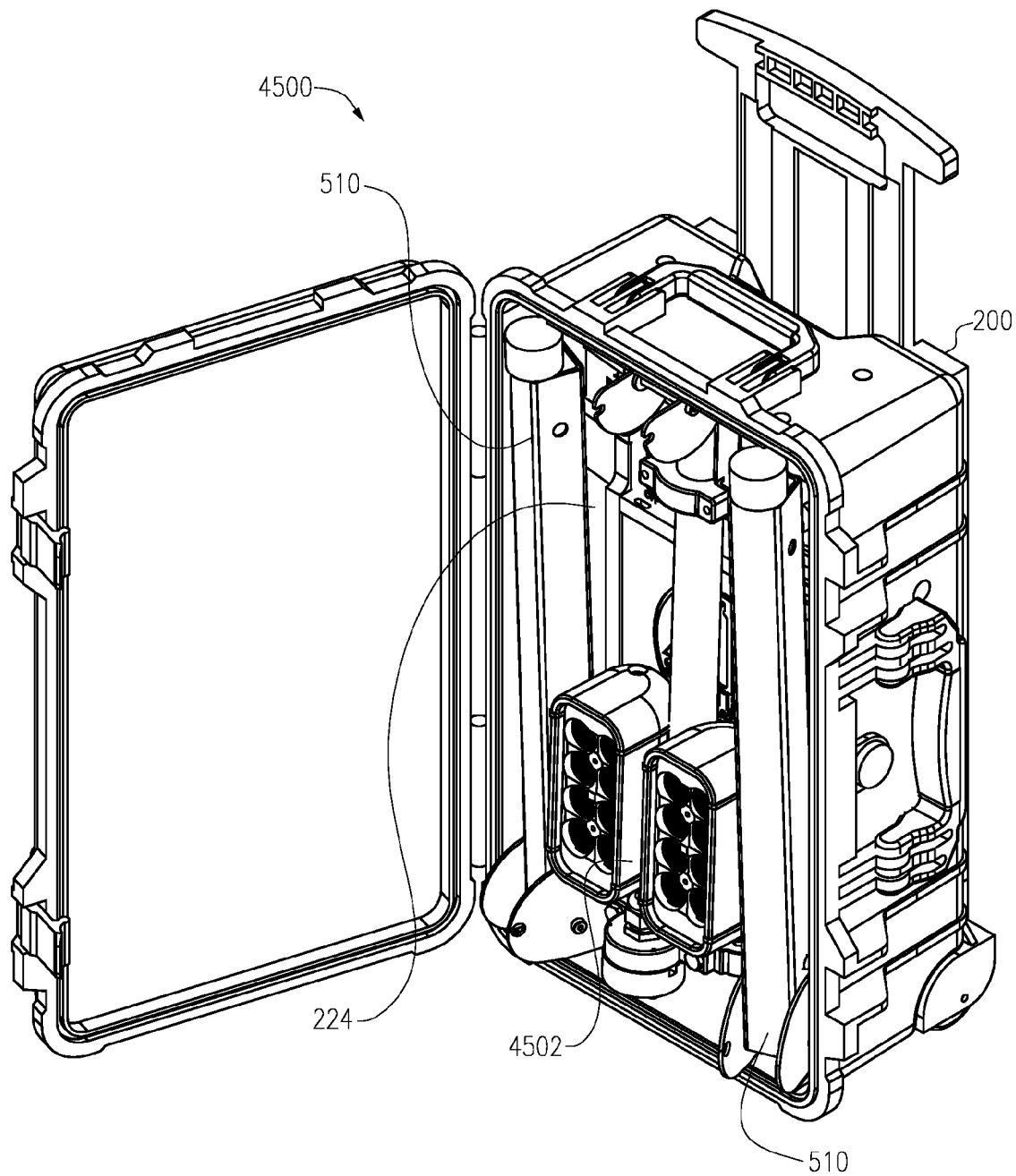
FIG. 46 is a top-angled perspective front view of the collapsible portable stand shown in FIG. 45 in which the leg assemblies, telescoping support and lighting assembly have been contracted and folded into the integral storage case.

FIG. 46 is a top-angled perspective front view of collapsible portable stand 4500, described above with respect to FIG. 45 in which each leg assembly 510, telescoping mast 2002 and lighting assembly 4502 have been contracted and folded into interior space 224 of integral case 200.

Figure 47:
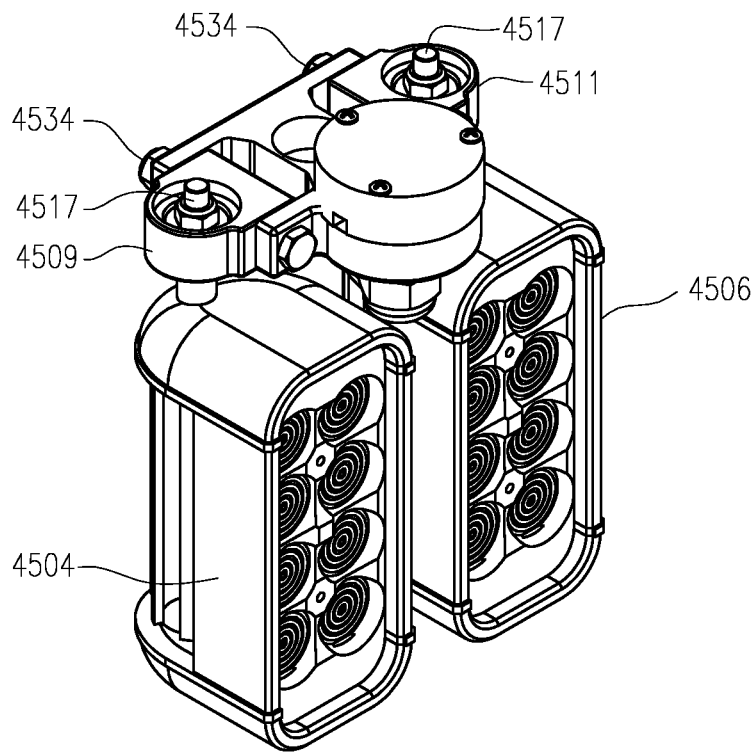
FIG. 47 is a top-angled perspective front view of the lighting assembly of FIG. 46, shown in a folded configuration.
Figure 48:
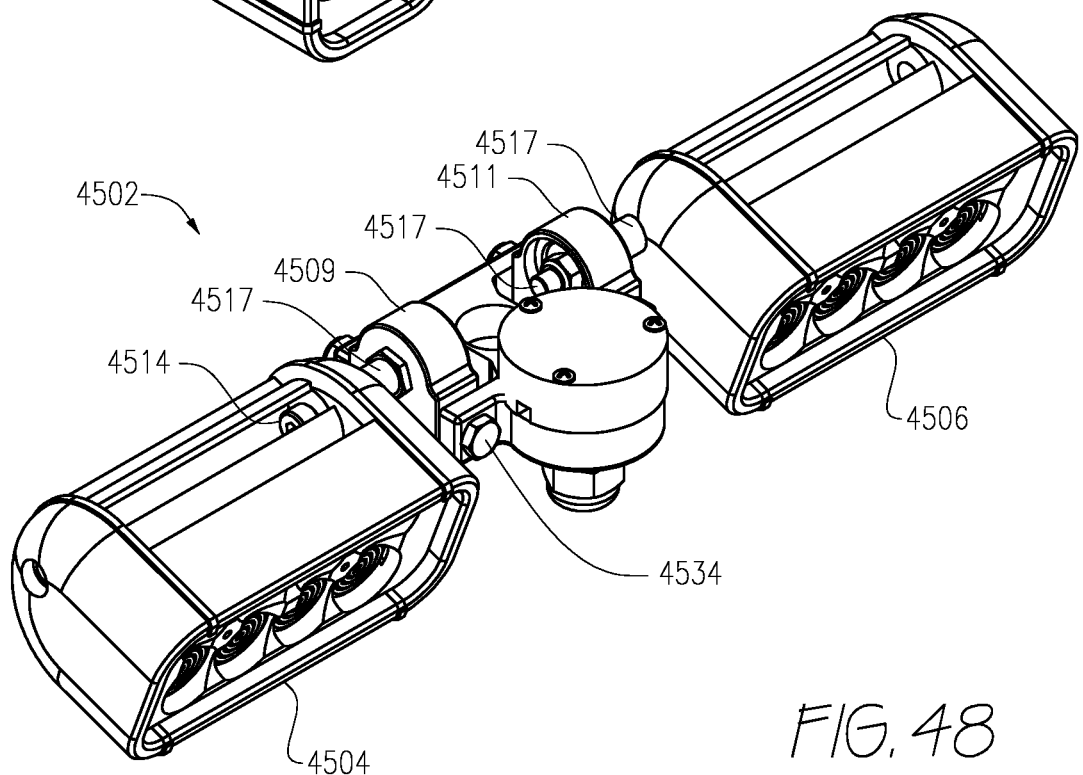
FIG. 48 is a top-angled perspective front view of the lighting assembly of FIG. 46, shown in an open/expanded configuration.
Figure 49:
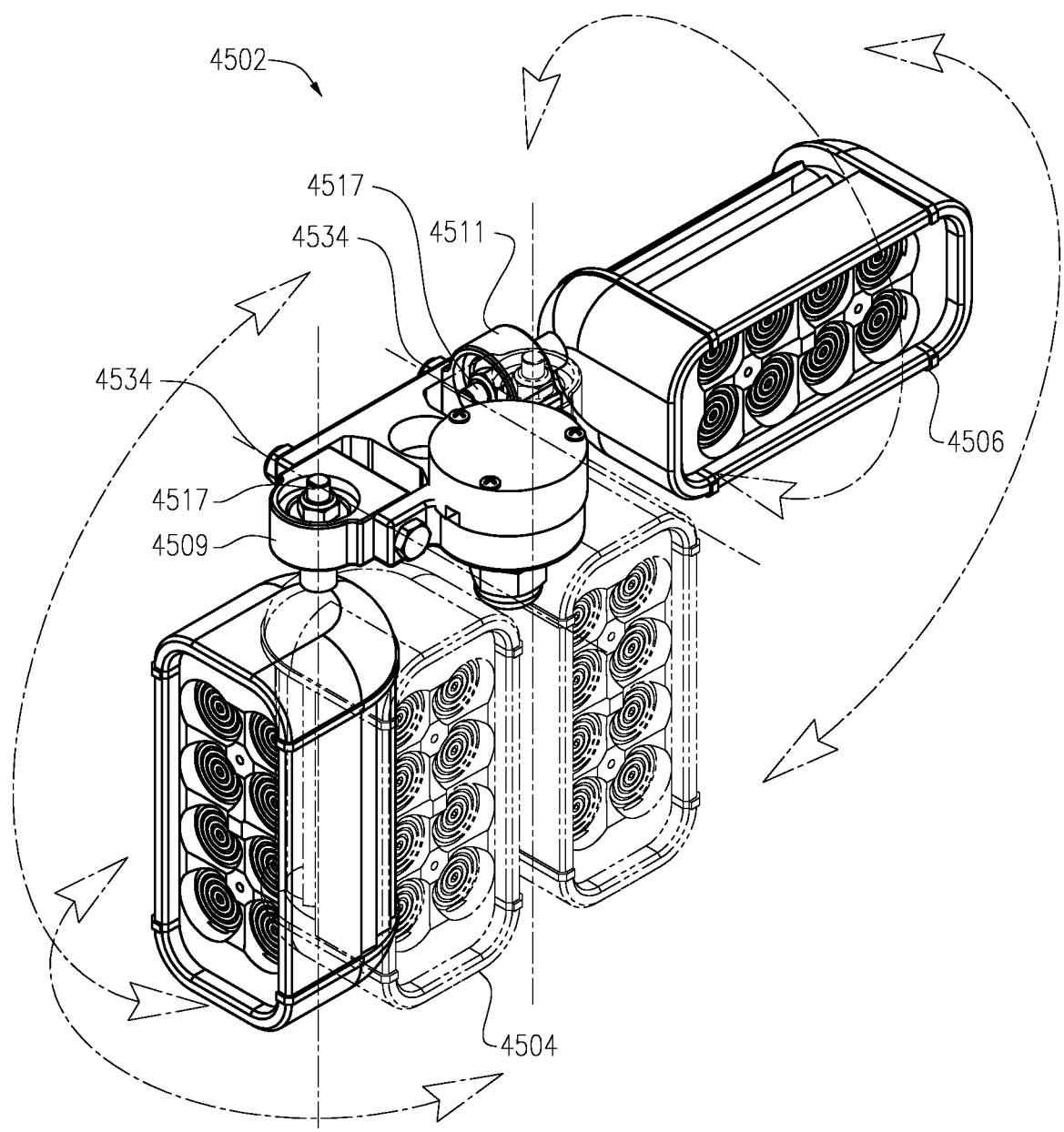
FIG. 49 is a top-angled perspective front view of the assembly of FIG. 46 in which the degrees of freedom of motion for functional devices (e.g., lights attached to the mount) are demonstrated in this example with changing the configuration of the lighting system from the folded configuration of FIG. 47 to the open/expanded configuration of FIG. 48.
Figure 50:
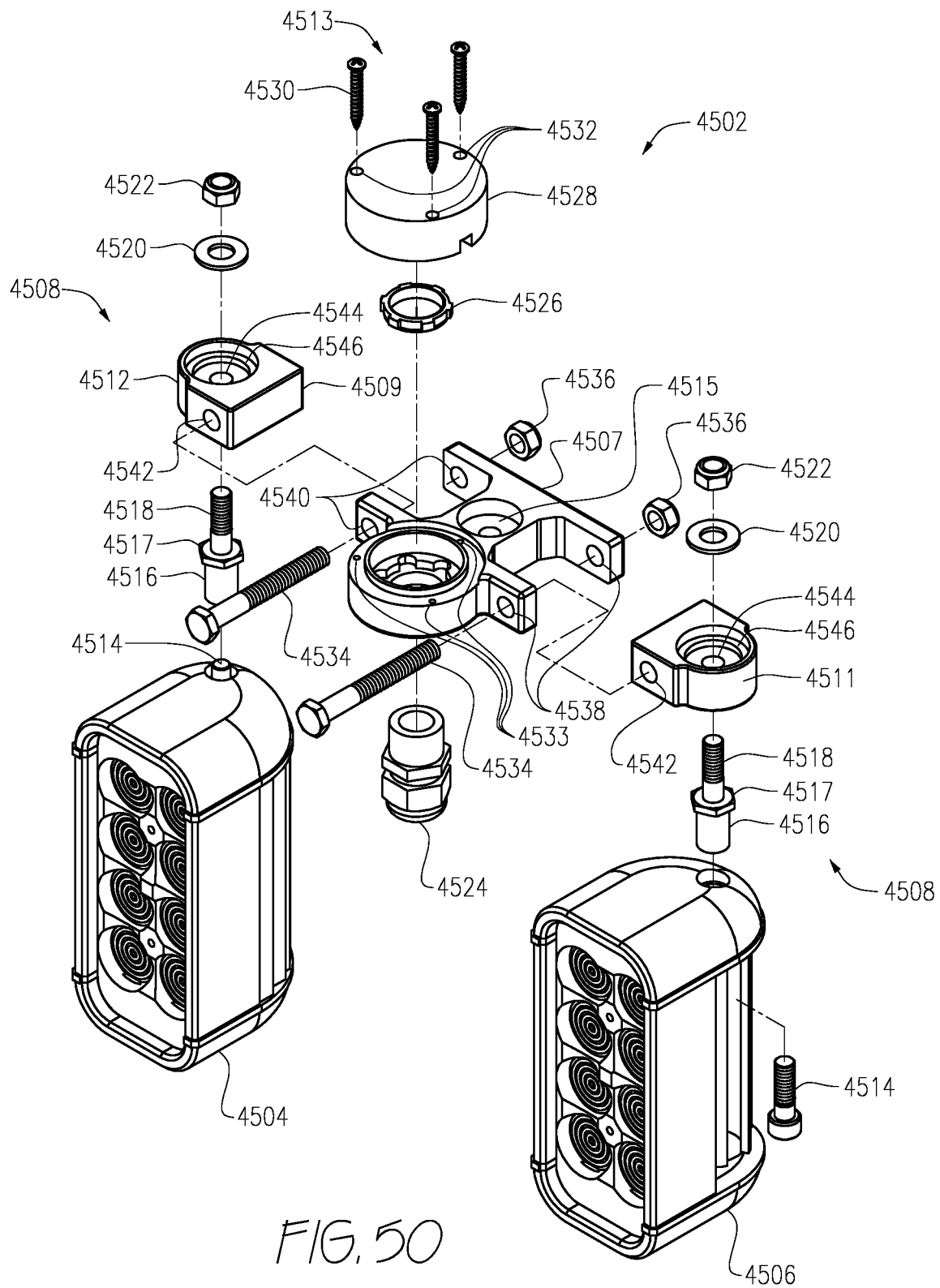
FIG. 50 is an exploded top-angled perspective front view of the mounts with lights shown in FIG. 49.

FIG. 47 is a top-angled perspective front view of lighting assembly 4502 of FIG. 46 in a folded configuration. FIG. 48 is a top-angled perspective front view of lighting assembly 4502 in an open/expanded configuration. FIG. 49 is a top-angled perspective front view of lighting assembly 4502 in which the degrees of freedom of motion are demonstrated in changing the configuration of the lighting system from the folded configuration of FIG. 47 to the open/expanded configuration of FIG. 48. FIG. 50 is an exploded top-angled perspective front view of lighting assembly 4502.

As shown in FIG. 50, a new mast mounting fixture 4507 is shown that can be rotatably mounted onto a mast (or other structure) via mast attachment fitting 4515. Lighting assembly 4502 incorporates mast mounting fixture 4507, and includes a first electrical light 4504, a second electrical light 4506 and assembly yoke 4508. Assembly yoke 4508 includes a first pivot mount 4509, a second pivot mount 4511, and an integrated electrical box 4513. Pivot mounts 4509 and 4511 are each directly attached to a rotatable connector for a light fitting, so that each light or other functional attachment connected to a pivot mount can rotate with respect its mount, e.g., 4509, and pivot up and down with respect to its mount. Hence both lights in FIG. 50 can rotate independently of each other in their respective pivot mounts, as well as be independently pivoted up and down in their respective mounts. In addition, the entire mast mounting fixture 4507 with the functional attachments connected thereto can be rotated about the mast. This creates multiple degrees of freedom of motion for each functional attachment. Further, since the height of the mast can be adjusted, an additional degree of freedom of motion for adjusting functional attachments to the mast is provided. In an embodiment, mast attachment fitting 4515 permits an optional mast extension to be mounted thereto, and the extension may be rotatably mounted in fitting 4515. By connecting one or more functional attachments to a second mounting fixture that provides for multiple degrees of freedom of motion for attachments, such as mounting fixture 4507, it is possible to have multiple and different functional attachments for which their direction can be independently adjusted. Mast mounting fixture 4507 may have more than two pivot mounts (e.g., such as 4509 and 4511), and include such extra mechanisms as may be needed to control functional attachments mounted thereon, as well as to incorporate and/or cooperate with electromechanical systems for remotely adjusting the direction (and optionally operation) of the functional attachment in each pivot mount. Multiple mast extensions may be utilized and electromechanically operated and/or monitored and controlled to create a multifunctional portable platform that can be remotely controlled. It is envisioned that one or more additional masts may be pivotally or otherwise mounted in or on the case. For extra stability, the legs may include means for attachment to a surface and/or the masts may be connected to the legs (e.g., see stabilizers in embodiments illustrated in FIGS. 53 and 55).

As further shown in FIG. 50, first light 4504 is connected to first pivot mount 4509 with a lower threaded bolt 4514, a rotating threaded coupler 4517, a washer 4520 and a nut 4522. Lower threaded bolt 4514 is passed through a casing of light 4504 and threaded into a threaded female end 4516 of rotating threaded coupler 4517. A threaded male end 4518 of rotating threaded coupler 4517 is passed through a through hole 4544 in a socket 4546 in first pivot mount 4509 and secured with washer 4520 and nut 4522. First pivot mount 4509 is mounted to lighting assembly yoke 4508 by aligning a through hole 4542 in first pivot mount 4509 with a through hole 4540 in lighting assembly yoke 4508, passing a bolt 4534 through the aligned holes and securing bolt 4534 with a nut 4536.

Similarly, as shown in FIG. 50, second light 4506 is connected to second pivot mount 4511 with a lower threaded bolt 4514, a rotating threaded coupler 4517, a washer 4520 and a nut 4522. Lower threaded bolt 4514 is passed through a casing of light 4506 and threaded into a threaded female end 4516 of rotating threaded coupler 4517. A threaded male end 4518 of rotating threaded coupler 4517 is passed through a through hole 4544 in a socket 4546 in second pivot mount 4511 and secured with washer 4520 and nut 4522. Second pivot mount 4511 is mounted to lighting assembly yoke 4508 by aligning a through hole 4542 in second pivot mount 4511 with a through hole 4538 in lighting assembly yoke 4508, passing a bolt 4534 through the aligned holes and securing bolt 4534 with a nut 4536.

In an embodiment, optional integrated electrical box 4513 receives at an open bottom face a threaded end of an electrical cable connector 4524, which is secured to an underside face of integrated electrical box 4513 with a threaded washer 4526 that is tightened on threads of electrical cable connector 4524 projected into an interior space of integrated electrical box 4513. Further, integrated electrical box 4513 receives at an open top face, an electrical box cover 4528 that is secured to the open top face with screws 4530 via holes 4532 in electrical box cover 4528 aligned with holes 4533 in the top face of integrated electrical box 4513.

As shown in FIG. 49, light 4504 pivots in a first direction within a socket 4546 of first pivot mount 4509 about an axis of rotating threaded coupler 4517, and light 4504 and first pivot mount 4509 pivot in a second direction, that is perpendicular to the first direction, about an axis of bolt 4534. Further, as shown in FIG. 49, light 4506 pivots in a first direction within a socket 4546 of second pivot mount 4511 about an axis of rotating threaded coupler 4517, and light 4506 and second pivot mount 4511 pivot in a second direction, that is perpendicular to the first direction, about an axis of bolt 4534. In addition, although not shown in FIG. 49, lighting assembly 4502 pivots in a third direction, that is perpendicular to both the first direction and the second direction, about an axis of telescoping mast 5124. By allowing light 4504 and light 4506 to each independently rotate on a different axis, lighting assembly 4502 may be configured to shine light in virtually any direction relative to a fixed position of telescoping mast 5124.

A suitable light for use in for example the embodiments shown in FIGS. 45-50 is available from Vision X Global Lighting Systems of Seattle, Wash., USA ("VISIONX"). For example, LED lights, such as but not limited to those available from VISIONX, are energy efficient and provide a bright stable light output. LEDs can be used to generate output at frequencies suitable for supporting night vision (e.g., for a platform/stand for monitoring in dark or low light situations, such as for border enforcement or guarding defensive perimeters). Suitable cases that can be modified to construct embodiments of the present invention, such as by modification to include extendable and collapsible legs, a mast, etc., are available from Pelican Products of Torrance, Calif. USA (e.g., models 1510 and 1560).

FIG. 51 is a top-angled front perspective view of a fourth exemplary embodiment of a collapsible portable stand with telescoping support. As shown in FIG. 51, a fourth embodiment of a collapsible portable stand with telescoping support 5100 includes, a two-wheeled cart 5101, a leg assembly unit 5107, a telescoping mast 5124, and a portable power supply 5104. The embodiment shown is useful for meeting the need for a stable portable platform for functional devices mounted and/or used at heights in excess of 15 feet or more than 20 feet. Ideally, the footprint of the unit when the mast is fully extended has a diameter about equal to the mast height, but the footprint can vary widely depending on the need and on the ability to anchor the legs to a surface.

Leg assembly unit 5107 includes three leg assembly supports, each leg assembly support 5108 configured with a leg assembly 5106 pivotally attached to a base of the leg assembly support at pivot through-pin 5120. Leg assembly unit 5107 includes a center space 5125 at the center of leg assembly unit 5107 that holds and retains telescoping mast 5124.

Two-wheeled cart 5101 includes a pair of main structural supports, each structural support 5102 includes a handle portion 5116, a vertical body portion 5103, a horizontal base portion 5105 and a lower vertical restraint portion 5118. A horizontal base portion 5105 of each structural support 5102 proximate to lower vertical restraint portion 5118 is connected, e.g., welded, bolted, etc., adjacent to each end of an axel 5110. A wheel 5112 is connected to each end of axel 5110. Leg assembly unit 5107 is affixed to the vertical body portions 5103 of two-wheeled cart 5101, thereby rigidly holding each respective vertical body portions of two-wheeled cart 5101 in the same vertical plane and parallel to each other. For example, in FIG. 51, leg assembly support 5108 is positioned to allow the respective leg assemblies to be pivotally lowered and to extend at 120° angles from a center point of cart 5101 the wheel. A double ended spring pin 518, as described above with respect to FIG. 5 and FIG. 6, is allowed to engage through holes 5122 to hold each lowered respective leg assembly in the lowered position, as described above.

As further shown in FIG. 51, a portable power supply 5104 with a handle 5140 is held in a position above axel 5110 and between the two wheels by lower vertical restraint portion 5118. Portable power supply 5104 may be temporarily removed from the cart 5101, if necessary, to allow one or more leg assemblies stored in leg assembly unit 5107 to be lowered, and may be replaced on the cart once the one or more leg assemblies have been lowered.

FIG. 52 is a top-angled rear perspective view of the collapsible portable stand with telescoping support shown in FIG. 51. In FIG. 52, cart 5101 is shown with portable power supply 5104 removed. Further, a support stand 5114 is shown attached to leg assembly unit 5107 so that cart 5101 stands perpendicular to a support surface, e.g., the ground or a floor. In one embodiment, support stand 5114 is adjustable to different heights to accommodate a support surface that is not level.

Figure 53:
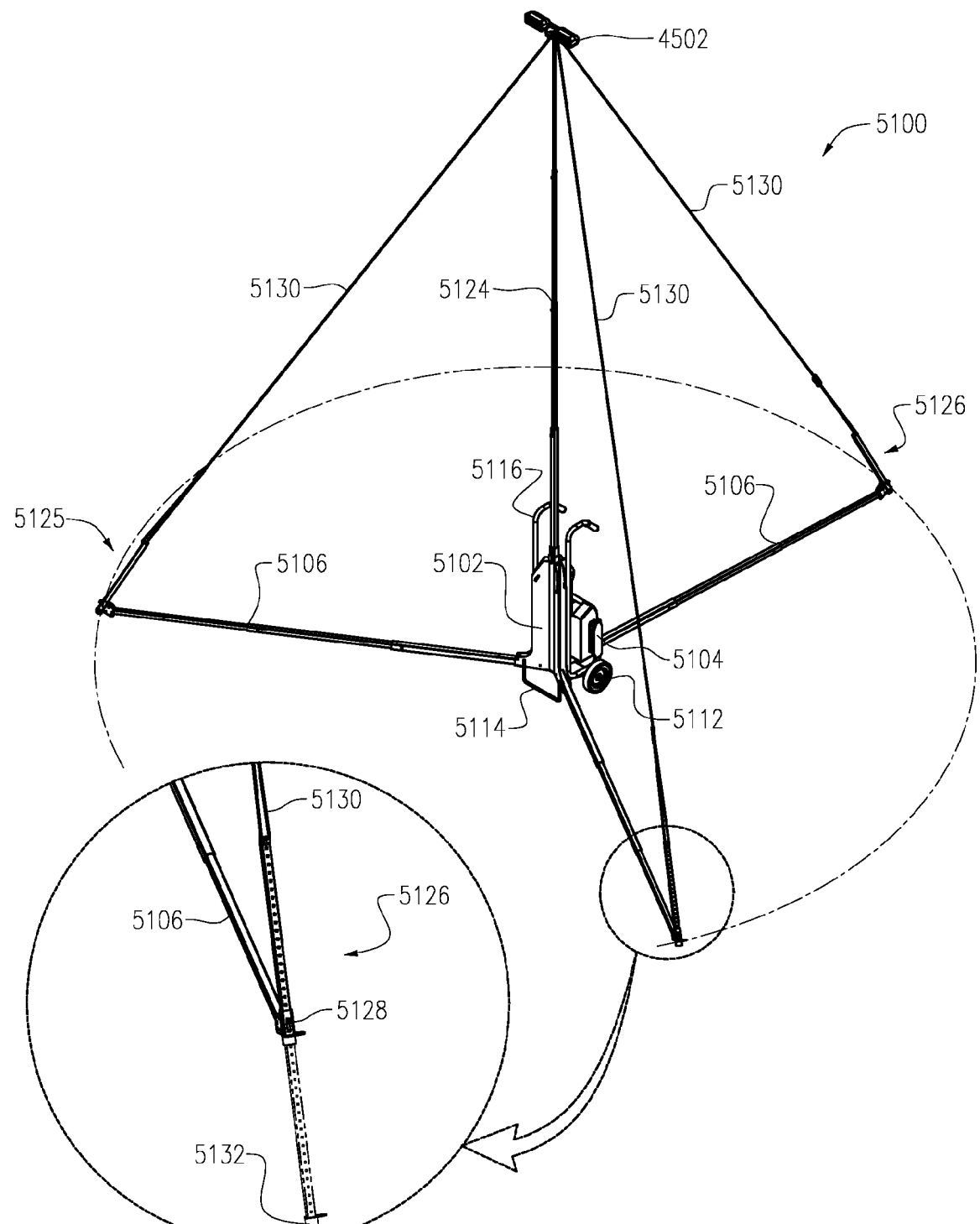
FIG. 53 is a top-angled rear perspective view of the collapsible portable stand of FIG. 51 configured with the leg assemblies and telescoping support fully extended with a lighting assembly mounted on the extended telescoping support.

FIG. 53 is a top-angled rear perspective view of collapsible portable stand 5100. As shown in FIG. 53, collapsible portable stand 5100 has been configured with a lighting assembly 4502 mounted on the extended telescoping support. The leg assemblies and telescoping support are fully extended.

As further shown in FIG. 53, the end leg segment of each leg assembly 5106 includes a leveling arm 5126. Leveling arm 5126 includes an adjustable clasp 5128 that is pivotally connected to an end of the leg assembly and allows a length of leveling arm 5126 that extends below clasp 5128 to be adjusted. A lower end of leveling arm 5126 terminates with a foot 5132 and opposite end of leveling arm 5126 attaches to a tension line 5130 that extends from leveling arm 5126 to a top section of the telescoping mast 5124. The length of tension line 5130 may be adjusted to provide even tension between the top of telescoping mast 5124 and each leveling arm 5126, thereby allowing telescoping mast 5124 to be held vertical and stable.

Figure 54:
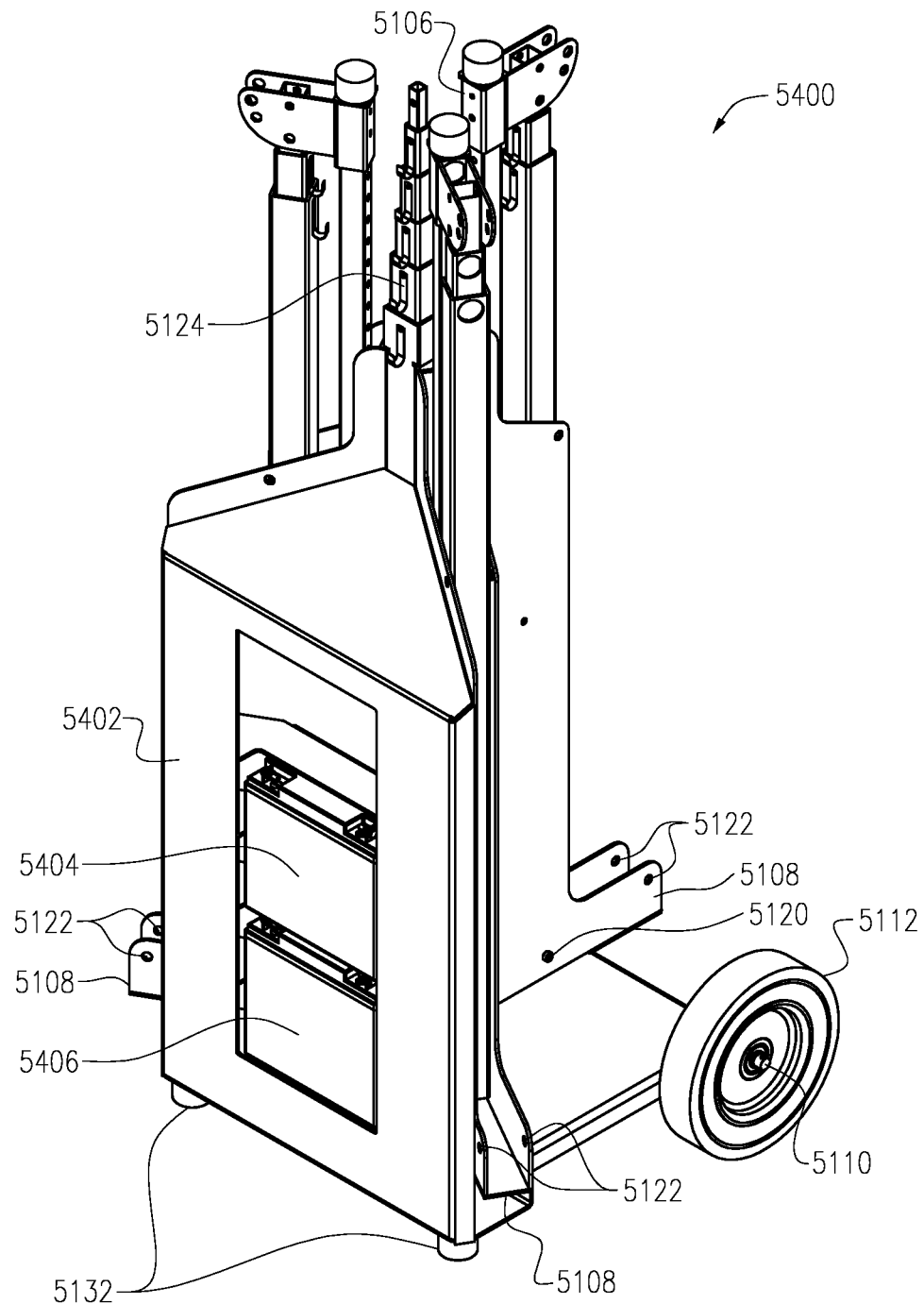
FIG. 54 is a top-angled perspective view of a fifth exemplary embodiment of a collapsible portable stand with telescoping support.

FIG. 54 is a top-angled perspective view of a fifth exemplary embodiment of a collapsible portable stand with telescoping support. As shown in FIG. 54, collapsible portable stand 5400 is very similar to the collapsible portable stand 5100 described above with respect to FIGS. 51-53. Like feature in FIG. 54 have been assigned like labels and will not be again described.

As shown in FIG. 54, collapsible portable stand 5400 includes a fixed power supply 5402, that replaces portable power supply 5104 and support stand 5114 of collapsible portable stand 5100. In the embodiment shown in FIG. 54, fixed power supply 5402 includes a first power source 5404, e.g., a battery or capacitor, and a second power source 5406.

FIG. 55 is a top-angled rear perspective view of collapsible portable stand 5400 with telescoping support. As shown in FIG. 55, collapsible portable stand 5400 has been configured with a lighting assembly 4502 mounted on the extended telescoping support. The leg assemblies and telescoping support have been fully extended.

As shown in FIG. 55, collapsible portable stand 5400 is configured for use in a manner very similar to collapsible portable stand 5100 described above with respect to FIG. 53. Like features in FIG. 55 have been assigned like labels and, therefore, are not again described.

Functional devices mounted to yoke 4508 described above with respect to FIGS. 47-50 are not limited to lights but include any electrical or non-electrical device including, but not limited to a light; a microphone; a camera; a loudspeaker; a weather monitoring device; a solar panel; and a motion sensing device, and other functional devices mentioned earlier.

An extendible leg assembly, as described above, is not limited to the use of leg segments arranged in a telescoping configuration, but that an extendible leg assembly may use folding leg segment and/or a combination of folding and telescoping leg segments.

References to attaching, securing, or fastening one component to another may be accomplished by any known technique appropriate within the context of the components being joined which includes, but is not limited to, the use of one or more bolts, screws, adhesive, metal welds, metal crimps, and any other form or attaching one component to another.

Case 200 described above may be equipped with tamper-proof features, particularly for government, military, border control, police and for other uses requiring enhanced security.

The dimensions and volumes of case 200 may be adjusted to meet specific needs. In one exemplary embodiment, the stand legs are 32 inches long, an aluminium mast can be extended to 8 feet in height, and the case is 8' deep, 22" in height, and 14" in width. The stand with a light fixture attached can withstand substantial winds without tipping. In a preferred embodiment, the case has sufficient volume to store dual LED lamp heads. Preferably, a battery or power supply is included inside the case, thus increasing the stability of the stand, while also making a more compact and useful deployable stand for lighting and other uses. Preferably, the mast can be extended to heights of at least 15 feet and preferably more than 20 feet above the surface on which a stand of the present inventions is mounted, so that a functional attachment on the top of the mast can be sufficiently stable to be utilized at such heights. It is envisioned that a self leveling laser level (or levels) may be mounted to the mast, such as those used by masons, with corresponding electromechanical components incorporated into the stand and/or cart embodiment.

The case may be made intrinsically safe for use for example in volatile atmospheres. This can be accomplished by use of suitable fittings, contacts, switches, etc. that are gas tight and dustproof, and low currents, solid state relays, etc.

In another embodiment, the case can include at least one seal and/or is waterproof. While lights are used in some examples herein, one or more of the new mounting fixture of the present invention may be used for mounting plural items such as microphones, in addition to or in place of the light fixtures. For example, an embodiment of the present inventions could be used in a remote location to mount a video camera or cameras, a microphone, a still camera or video camera to lock in for example the identify of persons passing through the location and/or vehicles at an intersection. Border control, law enforcement and/or military uses include monitoring of persons, animals and/or equipment passing through remote or dangerous locations in inhospitable areas, and may include defensive or offensive capabilities, ranging from tasing (i.e., electrical discharge) to lethal action as dictated by circumstances either automatically controlled with systems onboard or remotely controlled with human interaction. A check point could be remotely monitored, with a mechanical arm for gathering documents or "sniffing" persons and vehicles to detect weapons or drugs. Further, a plurality of the fixtures could be mounted in between extensions of the telescoping mast so that the mast may have multiple stages with different attachments, lights, cameras, GPS (i.e., global positioning system), microphones, gas monitors, alarms, output screen and/or printer, etc., which can be vertically spaced from each other, and each functional attachment will have multiple degrees of freedom of adjustment to optimize use of the mobile platform. In an embodiment a microprocessor and transceiver can be operatively connected to the mast to remotely monitor and control the apparatus, as well as store and process information. In an optional embodiment, small electromechanical adjusters can be included in the mast and/or in the multiple degrees of freedom hinges using large, small or micro-electromechanical actuators as is known to one of ordinary skill in the art. Thus, the functional attachments to the mast, as well as mast height can be remotely controlled and monitored.

The details of certain embodiments of the present inventions have been described, which are provided as illustrative examples so as to enable those of ordinary skill in the art to practice the inventions. The summary, figures, abstract and further details provided are not meant to limit the scope of the present inventions, but to be exemplary. The inventions are capable of other embodiments and of being practiced and carried out in various ways, and as such, those skilled in the art will appreciate that the conception upon which this disclosure is based may readily be utilized as a basis for the designing of other methods and systems for carrying out the several purposes of the present inventions. Where certain elements of the present inventions can be partially or fully implemented using known components, only those portions of such known components that are necessary for an understanding of the present invention are described, and detailed descriptions of other portions of such known components are omitted so as to avoid obscuring the invention. Further, the present invention encompasses present and future known equivalents to the components referred to herein.

What is claimed is:

1. A portable stand, comprising:
    a first case having an interior that defines an enclosed space;
    at least two extendible legs, each of said extendible legs being attached to said interior of said first case; and
    an extendible mast pivotally attached to said first case, wherein said extendable legs may be retracted for storage inside of said case and said mast can be retracted for storage inside of said case, said legs and said mast being extendable from said case at a site of use by manipulation of said legs and mast without requiring connection of parts thereto, wherein said mast can extend upward vertically higher than the height of said case when at least one of said legs extends horizontally from said case, wherein said at least one leg when extended horizontally provides stability for said mast when said mast extends upwards from said case;
    said mast and said at least two extendable legs being attached to the interior of said first case, wherein said at least two extendable legs and mast can be collapsed into the interior of said first case; and
    at least one functional device mounted to said extendible mast, said at least one functional device selected from the group consisting of a light, a microphone, a still camera, an audio output, a visual output, a laser, a weapon, a video camera, a transmitter, a receiver, a weather monitoring device, a solar panel, a surveying device, a motion sensing device, a chemical sensor, a thermal sensor, an alarm, a wind power generator, and a GPS device;
    said mast further comprises a mount for at least one of said at least one functional device, said mount permitting a functional device attached thereto to have multiple degrees of freedom of motion with respect to said mast, wherein when said mount has at least two functional devices connected thereto, each of said functional devices can be rotated or pivoted independently with respect to each other; and a second case mounted within said first case, and wherein said second case includes a control panel for an electrical supply, said functional devices comprise at least one light, and said control panel controls power when provided to said at least one light.

2. The stand of claim 1, wherein when said stand has said two legs extended outwardly and horizontally from said first case and said case is placed on a supporting surface, at least a portion of each of said two legs and at least a portion of said first case can each contact the supporting surface at different locations.

3. The stand of claim 2, wherein when said stand has said two legs extended outwardly from said first case said legs outwardly extend divergently from each other.

4. The stand of claim 1, further comprising a power supply.

5. The stand of claim 4, wherein said power supply comprises a battery.

6. The stand of claim 4, further comprising an input for an external power source.

7. The stand of claim 1, wherein said power supply comprises a rechargeable battery, and said stand further comprises an input for an external power supply, wherein said external power supply can recharge said rechargeable battery.

8. The stand of claim 1, wherein said extendible mast is pivotally attached to said first case.

9. The stand of claim 1, further comprising:

a power supply mounted within said first case.

* * * * *